(12) United States Patent
Fundak et al.

(10) Patent No.: US 8,122,763 B2
(45) Date of Patent: Feb. 28, 2012

(54) BREATHING GAS SUPPLY VISUAL BROADCAST APPARATUS

(75) Inventors: Ronald Fundak, Clarks Summit, PA (US); Gary L. Felske, Newbern, NC (US)

(73) Assignee: Avair, LLC, Edwardsville, IL (US)

( * ) Notice: Subject to any disclaimer, the term of this patent is extended or adjusted under 35 U.S.C. 154(b) by 565 days.

(21) Appl. No.: 12/287,337

(22) Filed: Oct. 8, 2008

(65) Prior Publication Data

US 2009/0126482 A1 May 21, 2009

Related U.S. Application Data

(63) Continuation-in-part of application No. 12/215,436, filed on Jun. 27, 2008, and a continuation-in-part of application No. 11/849,993, filed on Sep. 4, 2007, now abandoned.

(60) Provisional application No. 60/998,206, filed on Oct. 8, 2007, provisional application No. 60/824,303, filed on Sep. 1, 2006, provisional application No. 60/946,496, filed on Jun. 27, 2007.

(51) Int. Cl.
*G08B 21/02* (2006.01)
*G08B 5/38* (2006.01)

(52) U.S. Cl. ..... 73/293; 340/614; 340/626; 128/201.27; 128/202.22; 128/204.22; 128/204.26; 128/205.23

(58) Field of Classification Search .......... 340/612, 340/614, 626; 128/201.27, 202.22, 204.18, 128/204.22, 204.26, 205.23
See application file for complete search history.

(56) References Cited

U.S. PATENT DOCUMENTS 5,097,826 A * 3/1992 Gray et al. ............... 128/204.18
(Continued)

FOREIGN PATENT DOCUMENTS

WO WO-2004018013 A2 3/2004
(Continued)

OTHER PUBLICATIONS

"International Application Serial No. PCT/US2007/077563, International Search Report and Written Opinion mailed Aug. 28, 2008", 13 pgs.
(Continued)

*Primary Examiner* — Daniel Larkin
(74) *Attorney, Agent, or Firm* — Schwegman, Lundberg & Woessner, P.A.

(57) ABSTRACT

A gas measurement apparatus can comprise a sensor and a processor, in an example. The sensor can measure a pressure condition of a gas tank, in an example. The processor can select at least one light source, the light source can be positioned or be of a distinct color to indicate a corresponding level of gas remaining in the tank when illuminated. The level of gas can be based on the measured pressure. Banks of high intensity LEDs can allow visually discernable colors at a significant distance underwater. A visual beacon mode can be included. An alphanumeric pressure readout mode can be included. A depth sensor can be included.

24 Claims, 43 Drawing Sheets
(9 of 43 Drawing Sheet(s) Filed in Color)

U.S. PATENT DOCUMENTS

| | | |
|---|---|---|
| 5,570,688 A | 11/1996 | Cochran et al. |
| 5,796,681 A | 8/1998 | Aronzo |
| 5,804,829 A | 9/1998 | Palmer |
| 6,032,664 A * | 3/2000 | Gray et al. ............... 128/201.27 |
| 6,054,929 A | 4/2000 | Garofalo et al. |
| 6,293,685 B1 | 9/2001 | Polkow |
| 6,856,578 B2 | 2/2005 | Magine et al. |
| 6,996,916 B2 | 2/2006 | Cafaro |
| 2003/0234018 A1 | 12/2003 | Haston et al. |
| 2004/0046710 A1 * | 3/2004 | Adams et al. ..................... 345/8 |
| 2004/0160769 A1 | 8/2004 | Currie et al. |
| 2005/0263155 A1 | 12/2005 | Gossweiler |
| 2008/0066748 A1 | 3/2008 | Felske et al. |
| 2009/0096619 A1 | 4/2009 | Felske et al. |

FOREIGN PATENT DOCUMENTS

| | | |
|---|---|---|
| WO | WO-2009048569 A1 | 4/2009 |

OTHER PUBLICATIONS

"International Application Serial No. PCT/US2007/077563, International Preliminary Examination Report Mailed Mar. 9, 2009", 27 pgs.

"International Application Serial No. PCT/US2008/011580, International Search Report mailed Mar. 5, 2009", 4 pgs.

"International Application Serial No. PCT/US2008/011580, Written Opinion mailed Mar. 5, 2009", 7 pgs.

* cited by examiner

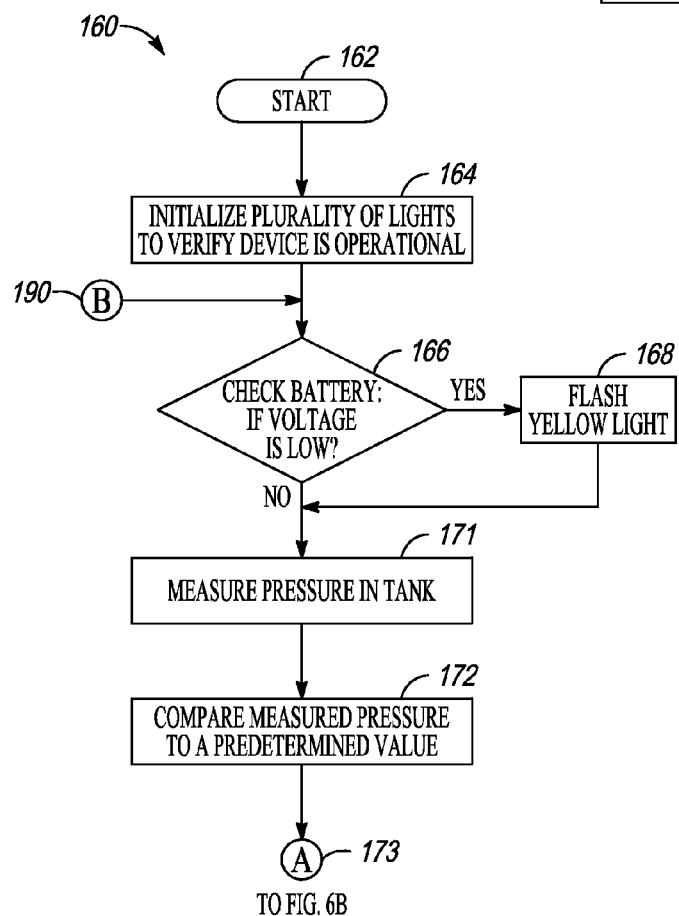

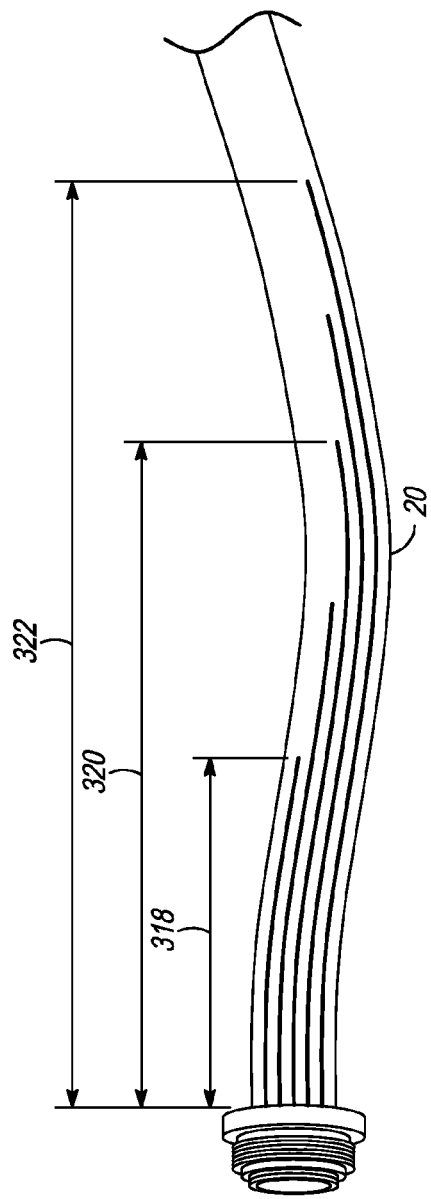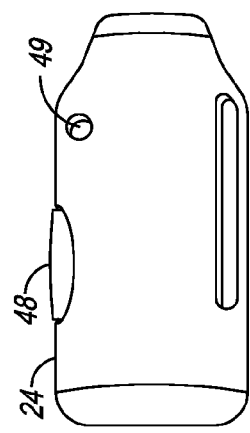
FIG. 21

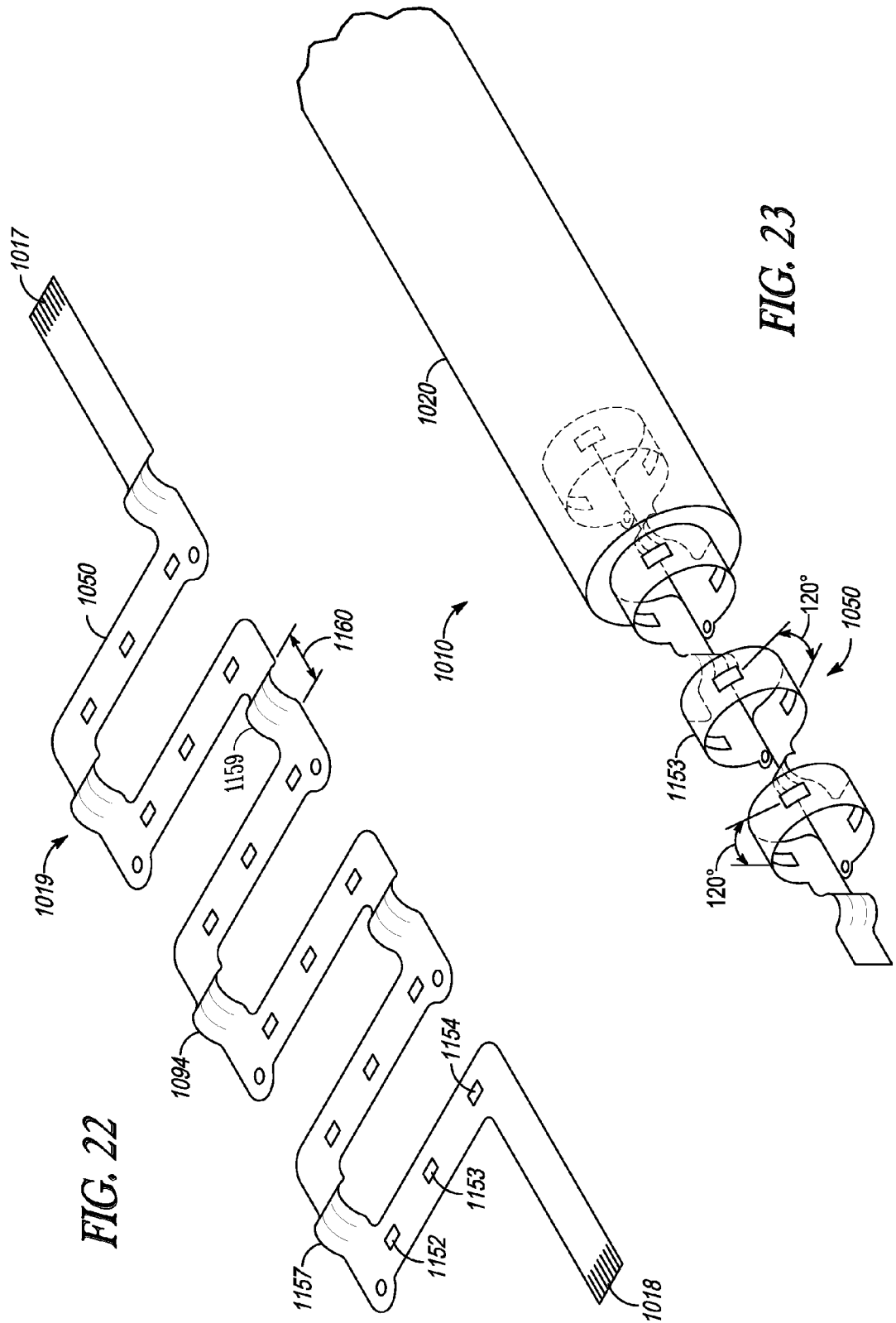

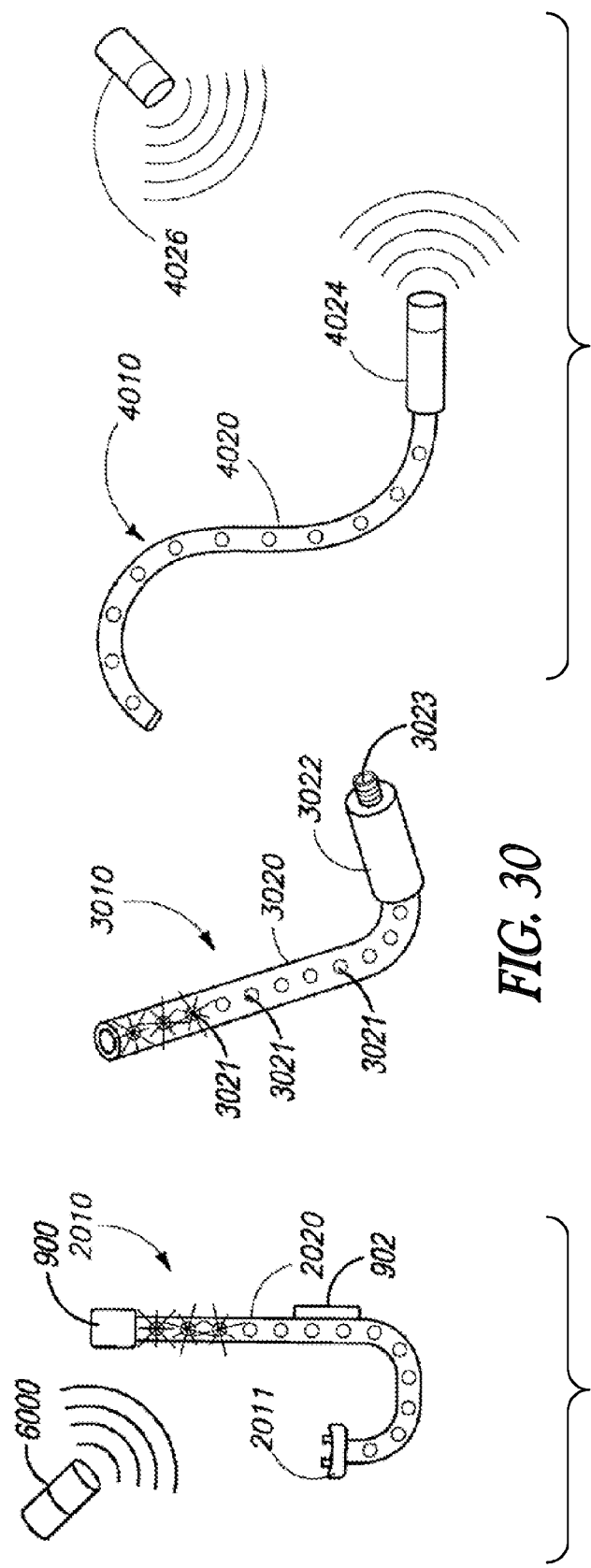

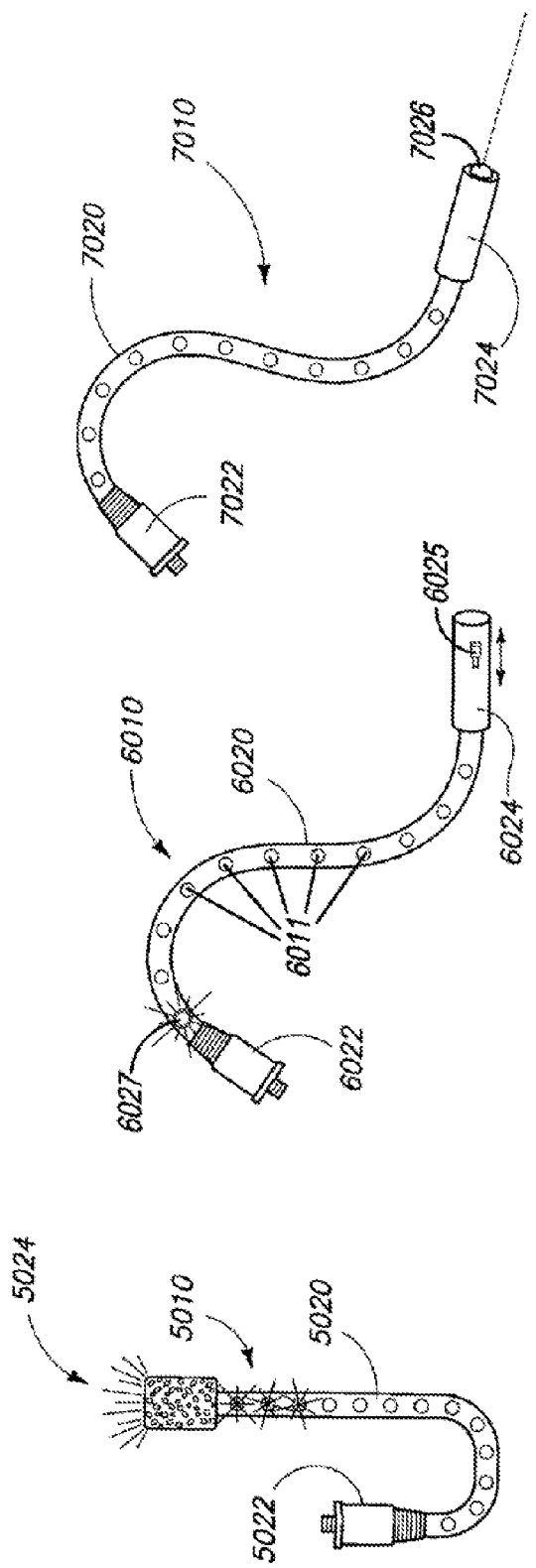

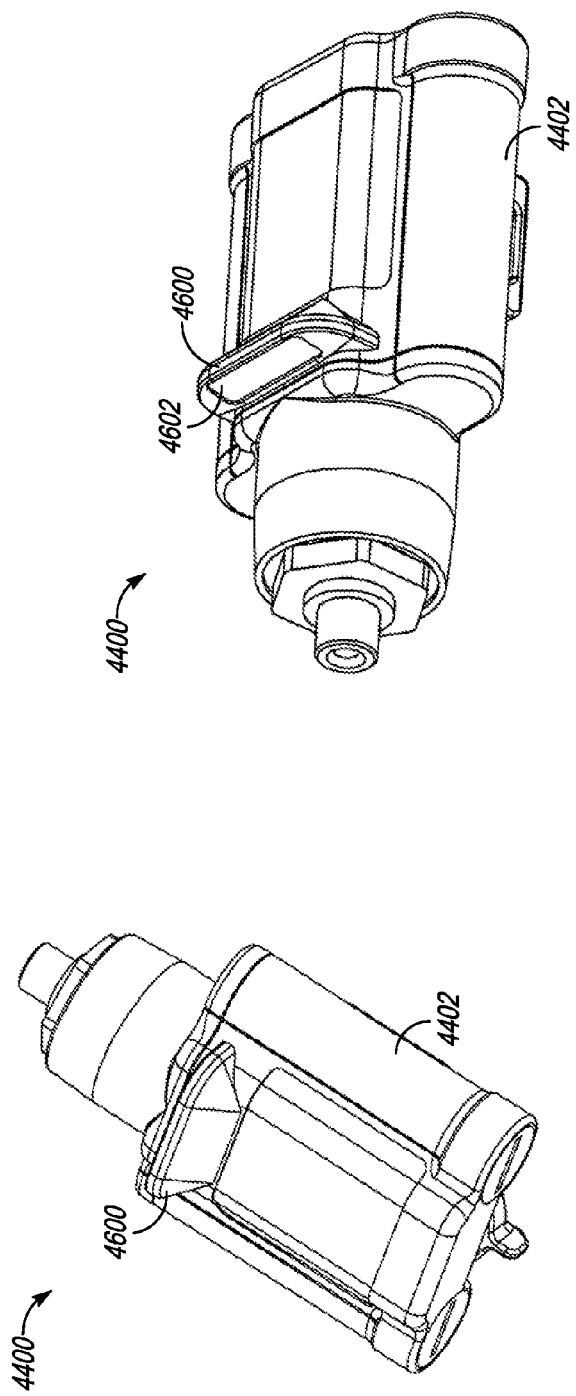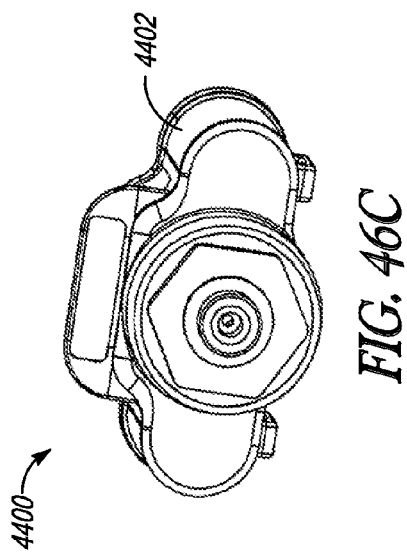

BREATHING GAS SUPPLY VISUAL BROADCAST APPARATUS

CLAIMS OF PRIORITY

1. This patent application claims the benefit of priority, under 35 U.S.C. Section 119(e), to Gary Felske et al. U.S. Provisional Patent Application Ser. No. 60/998,206, entitled "BREATHING GAS SUPPLY VISUAL BROADCAST APPARATUS," filed on Oct. 8, 2007, which is incorporated herein by reference in its entirety.

2. This patent application is a continuation-in-part of and claims the benefit of priority, under 35 U.S.C. Section 120 to Gary Felske et al., U.S. patent application Ser. No. 11/849,993, entitled "BREATHING GAS SUPPLY VISUAL BROADCAST APPARATUS AND METHOD", filed on Sep. 4, 2007 now abandoned, which is incorporated herein by reference in its entirety and which claims the benefit of priority, under 35 U.S.C. Section 119(e), to Gary Felske, U.S. Provisional Patent Application Ser. No. 60/824,303, entitled "AIR SUPPLY WARNING SYSTEM", filed on Sep. 1, 2006.

3. This patent application is a continuation-in-part of and claims the benefit of priority, under 35 U.S.C. Section 120, to Gary Felske et al., U.S. patent application Ser. No. 12/215,436, entitled BREATHING GAS SUPPLY VISUAL BROADCAST APPARATUS, filed on Jun. 27, 2008, which claims the benefit of priority, under 35 U.S.C. Section 119(e), to Gary Felske U.S. Provisional Patent Application Ser. No. 60/946,496, entitled "AIR SUPPLY WARNING SYSTEM," filed on Jun. 27, 2007, which are incorporated herein by reference in their entirety.

TECHNICAL FIELD

Embodiments of the present invention pertain generally to breathing gas supply status indicators, and more particularly pertain to breathing gas supply systems, air supply planning systems, and visual broadcast systems that provide condition/status information for a breathing gas supply.

BACKGROUND

Breathing pressurized gas is stored and delivered to individuals in a number of environments. For example, scuba divers, firefighters, high-altitude explorers, airplane pilots, emergency workers, search and rescue workers, patients, and the like, oftentimes carry and breathe the compressed air stored in tanks. The air supply is typically metered to the wearer via a regulator. Additionally, in the case of scuba divers, other mixed gases, such as nitrous oxide, may be stored and the gas supply is similarly metered to the wearer. As the user goes about his/her activities, it may be desirable to manage or plan the user's activities based on a condition of the air or gas supply (e.g., gas pressure). Typically, the pressure of the air or gas is monitored by the user in order to estimate the remaining amount of pressurized gas in the tank. In this way, for example, a scuba diver or a firefighter may estimate the time for which they may remain in the environment. Alternatively, for a patient breathing oxygen at home or in a hospital environment must monitor a pressure gauge to know that amount of oxygen remaining in the tank.

SUMMARY

In the case of scuba diving, one of the principal requirements, as dictated by certification organizations, is proper attention to the amount of air remaining in the diver's air supply tank. The amount of remaining air in a diver's tank becomes critically important in the cases of cave diving, wreck diving, ice diving, and search and rescue diving because of the likelihood of being placed in an emergency situation. Typically, determining the amount of air remaining in a tank is accomplished by a user by frequently referring to an air supply gauge that mounts on the end of a pressure hose extending from a scuba tank regulator. In order to check that amount of air left in a tank, the diver is required to locate and retrieve the gas pressure gauge, then manipulate the gas pressure gauge to be placed in close proximity of the diver's mask, which enables the diver to view and read the gauge. Inattention to the quantity of air remaining in the tank may result in the diver ascending too quickly to the surface, once the diver recognizes that the air supply is critically low. Too-rapid of an ascent may result in serious injury or death to the scuba diver, which may be caused by decompression.

The problem of monitoring gas in a tank of, for example, breathable air may be further exacerbated where a scuba diving guide, or an instructor, is leading a group of student/novice scuba divers on an underwater excursion or is providing open water instruction on dive techniques to a group of students. The guide or instructor needs to be conscious of the fact that each student diver consumes air at a different rate. For example, an expert scuba diver may use one-third the amount of air that a novice diver may use. Accordingly, the guide or instructor may have to keep reminding the group of students to check their individual air pressure gauges. Typically when underwater, the instructor uses hand signals to remind the students to check the pressure gauge, which may not be necessarily accurate because a student may not notice the instructor's hand signal and, therefore, may not check the air pressure gauge. Further, if the instructor is concerned about the state of a particular student's air supply, the instructor typically swims over to the particular student diver and manually checks the student diver's pressure gauge in order to verify the air supply is adequate for the period of time the group has been diving. Even when a student diver understands and accurately observes the specific hand signals, he or she may incorrectly give the guide/instructor an "OK-sign" to indicate that their air supply is sufficient, when in actuality the air pressure is insufficient. For instance, the student diver may incorrectly believe his/her air supply is at an adequate level or sufficient, or the student diver may misread the pressure gauge before giving the "OK-sign." However, sometimes the student diver will incorrectly give the "OK-sign" to indicate that they have enough air pressure to remain submerged for a longer duration of time when instead they should immediately commence returning to the surface because they do not have enough air pressure in the tank. For instance, an adequate pressure of 1000 psi may be required for the student to return to the surface at a sufficiently slow rate to avoid injury from expanding blood and lung gases (e.g., the bends). As a result of incorrectly reading the air pressure gauge or not frequently checking the air pressure gauge, some divers may allow the air pressure in the tank to drop to less than the required air pressure needed (e.g., a few hundred psi) before beginning a safe ascent.

Thus, it is desirable to manage the user's activities based on a condition of the air or gas supply (e.g., gas pressure). Accordingly, improvements are needed for increasing the ability to discern a condition of one or more gas supplies by one or more individuals, such as by guides and instructors. This need is particularly relevant for individuals using pressurized air supplies so the individual and members of a group may identify when the air supply is running low without having to look at a pressure gauge.

Also accordingly, there is a need for a breathing gas supply that allows a user of a pressurized air supply to know when their gas supply is running low without having to manipulate a pressure gauge by broadcasting visually a status of the gas supply. There is also a need for a breathing gas supply status indicator that allows others in the vicinity of the user of a pressurized gas supply to observe the status of the gas supply for the user. Further, there is also a need to concurrently provide a user with a corresponding audible status alert when the gas supply is below a predetermined level.

In one embodiment of the invention, a user interface for a breathing gas supply system is provided. The user interface includes a distributed light source having a plurality of illumination zones, each illumination zone is correlated to a condition of the gas in a breathing gas supply system.

In another embodiment of the invention, an air supply status indicator is provided. The status indictors include an elongate light tube having a plurality of unique, optically discernible illumination regions each viewable about an entire cross-sectional periphery of the tube.

In an alternative embodiment of the invention, an apparatus for monitoring a condition of a breathing gas supply by illuminating optically distinct regions that are visible to a user, and by others in a common group, are provided. The breathing gas supply apparatus includes a sensor, processing circuitry, memory, a power supply, and a flexible light transmissive tube having a distributed light source. The sensor detects a condition of a breathing gas supply and generates an output signal correlated with the detected condition. The memory communicates with the processing circuitry and stores the output signal in memory. The flexible light transmissive tube communicates at a proximal end with the pressure sensor and at a distal end with the power supply. The distributed light source illuminates a plurality of optically distinct regions within the tube, where each illuminated region indicates the detected condition of the breathing gas supply within a predetermined value.

Optionally, in another embodiment of the invention, a method for planning a scuba diving event is provided where a scuba diver utilizes the breathing gas supply apparatus having a tank with a pressure gauge connected to a sensor that detects a pressure of the gas supply and is communicatively coupled to the plurality of lights. The method includes checking that at least one set of lights are illuminated to indicate the gas supply is full and at a predetermined level, the scuba diver diving under a body of water, verifying a first plurality of lights remain illuminated in the water and visible as the diver descends deeper in the body of water, and visually monitoring for a change in the lights as the sensor determines changes in the gas pressure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 6A and 6B illustrate a process for detecting a pressure in a gas tank and illuminating zones within the visual broadcast device of FIG. 2 formed in accordance with an embodiment of the present invention.

FIG. 21 illustrates a visual broadcast apparatus using a plurality of various length fiber optics to transmit the light utilized in accordance with an embodiment of the invention.

FIG. 22 illustrates a flex circuit board having a plurality of light emitting diodes (LEDs) utilized in accordance with an embodiment of the invention.

FIG. 23 illustrates the flex circuit board of FIG. 21 being inserted into a flexible light tube formed in accordance with an embodiment of the invention.

FIG. 29 illustrates a visual broadcast device wherein a snorkel is provided having a double wall, with a clear outer wall terminating in a mouthpiece formed in accordance with an embodiment of the invention.

FIG. 30 illustrates a visual broadcast device having a clear and flexible double walled sleeve including an array of lights distributed between the inner and outer walls formed in accordance with an embodiment of the invention.

FIG. 31 illustrates a visual broadcast device including a battery holder and receiver housing configured to receive control signals from a sonic transmitter formed in accordance with an embodiment of the invention.

FIG. 32 illustrates a visual broadcast device that includes a flexible and light transmissive tube having a plurality of lights with a positive buoyancy that elevates the tube when attached to the regulator utilized in accordance with an embodiment of the invention.

FIG. 33 is even another version of visual broadcast device including a flexible light transmissive tube having a super bright LED formed in accordance with an embodiment of the invention.

FIG. 34 illustrates a visual broadcast device having a laser pointer that can be activated by a user to point at items underwater and to be used as a long distance beacon formed in accordance with an embodiment of the invention.

FIGS. 46A, 46B, and 46C illustrate an example in which the visual broadcast device additionally includes an alphanumeric pressure readout display utilized in accordance of an embodiment of the invention.

DETAILED DESCRIPTION

In the following detailed description, reference is made to the accompanying drawings which form a part hereof, and which is shown by way of illustration specific embodiments in which the present invention may be practiced. These embodiments, which are also referred to herein as "examples," are described in sufficient detail to enable those skilled in the art to practice the invention, and it is to be understood that the embodiments may be combined, or that other embodiments may be utilized and that structural, logical and electrical changes may be made without departing form the scope of the present invention. For example, embodiments may be used by scuba divers, firefighters, high-altitude explorers, airplane pilots, emergency workers, and the like. The following detailed description is, therefore, not be taken in a limiting sense, and the scope of the present invention is defined by the appended claims and their equivalents. In this document, the terms "a" or "an" are used, as is common in patent documents, to include one or more than one. In this document, the term "or" is used to refer to a nonexclusive or, unless otherwise indicated.

Figure 1:
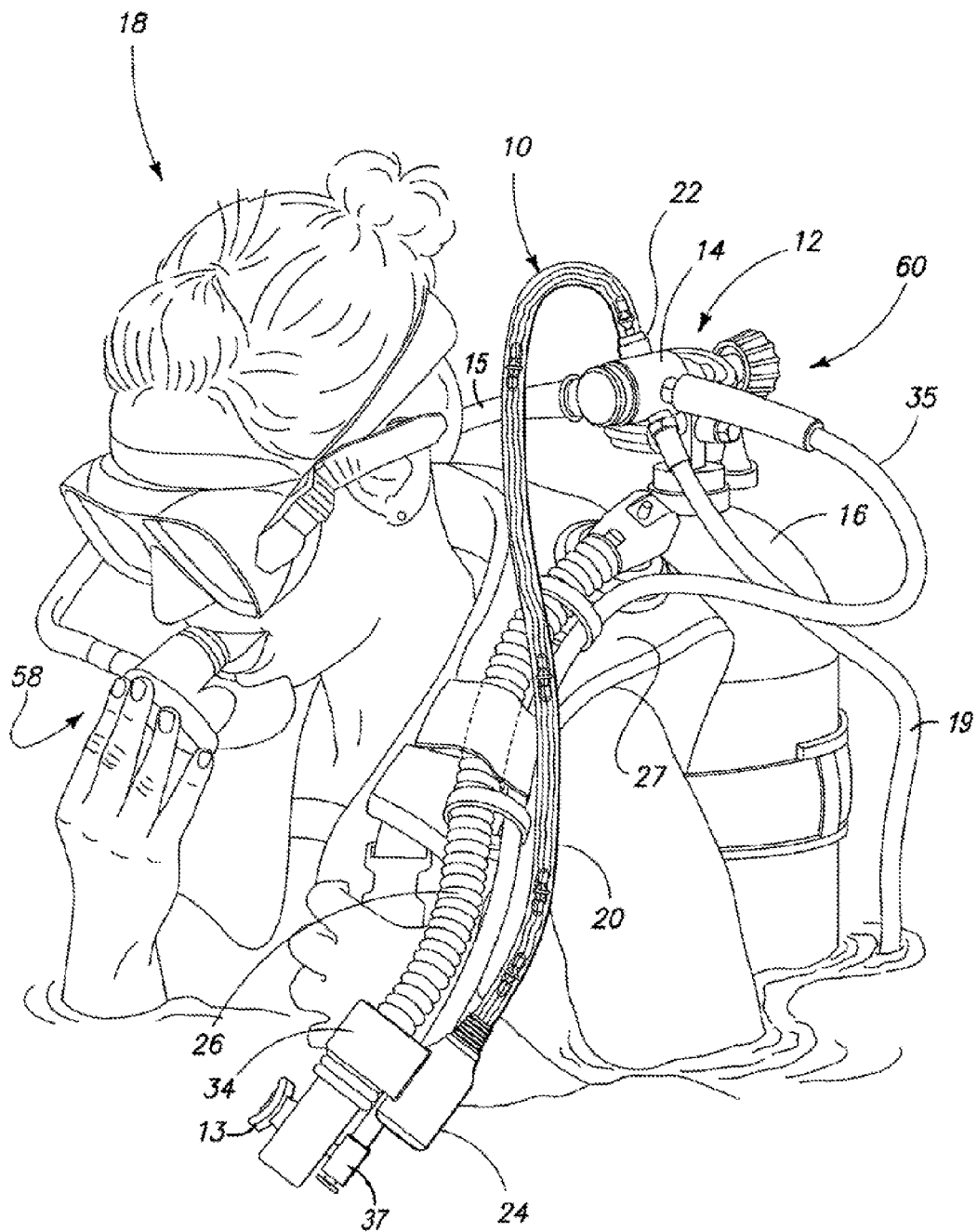
FIG. 1 depicts a scuba diver on the water surface using a visual broadcast device and preparing to submerge into the water in accordance with an embodiment of the present invention.

FIG. 1 depicts a scuba diver 18 on the water surface using a visual broadcast device 10 preparing to submerge into the water in accordance with one embodiment of the present invention. The visual broadcast device 10 is connected to, for example, a scuba diving system 60. The scuba diving system 60 includes an air tank 16 connected to a first stage regulator 14 having a high pressure port (not shown) and a low pressure port (not shown). Connected to the first stage regulator 14 is a reduced pressure, or second stage, pressure hose 35 for supplying air to inflate buoyancy compensator 27. The buoyancy compensator 27 includes a push button 37, a mouthpiece 13, and a hose 26 and is affixed by a strap 34 to the broadcast device 10. The broadcast device 10 has a flexible, pressure indicator light tube 20, a pressure sensor unit 22, and a battery unit 24. The sensor unit 22 is threaded into air pressure communication with the high pressure port (not shown) on a first stage of the scuba regulator 14. The regulator also may include a low pressure port (not shown) connected to a low pressure hose 15 that is connected to a regulator 58 from which diver 18 may breathe. Also connected to the first stage regulator may be a spare air hose 19. Typically, tank 16 may contain compressed air such as compressed oxygen, and at times a mixture of breathable gases such as oxygen and nitrogen, and the condition of the gas tank 16 may be based on a detected air pressure in the tank 16.

According to one embodiment, hose 20 is made from any clear and flexible plastic material (e.g., such as polyvinylchloride (PVC), polyester, vinyl, and the like). Other suitable clear or translucent materials can also be used. Sensor housing 22 connects in sealed relation with first stage 14 in direct communication with a high pressure port on first stage 14. However, hose 20 is not exposed to pressurized air as a sensor within housing 22 generates an output signal in proportion to air pressure detected at first stage 14 that indicates the pressure of air within tank 16. Hose 20 is constructed to house lights inside in a waterproof configuration, as will be discussed below in greater detail. Furthermore, sensor housing 22 is mounted onto first stage 14 of regulator 12 on a posterior side of diver 18, while battery housing 24 is mounted onto buoyancy compensator hose 26 on an anterior side 58 of diver 18. In this manner, the generation of light output from each unique illumination zone of hose 20 can be seen from a broad range of directions (e.g., omni-directional) and a range of distances (e.g., inches to feet, such as a few feet when two buddy divers are swimming next to the diver; a person remote from the diver in clear water one-hundred-fifty feet away; or a person remote from the diver swimming in murky water twenty-five feet away. Alternatively, two firefighters may be remotely situated in a smoke filled environment when extinguishing a fire in a building such that they can monitor each other's air pressure from up to fifty feet away). The visual broadcast device 10 also serves as a diver locator. Each diver has at all times at least one zone of lights illuminated, and the lights are in close proximity (e.g., inches to three feet) to their body. Any diver may be able to locate a diver based on the visual broadcast device 10 which may illuminate at least one zone of illuminated lights, even in murky water when a diver's body may not be seen.

Figure 2:
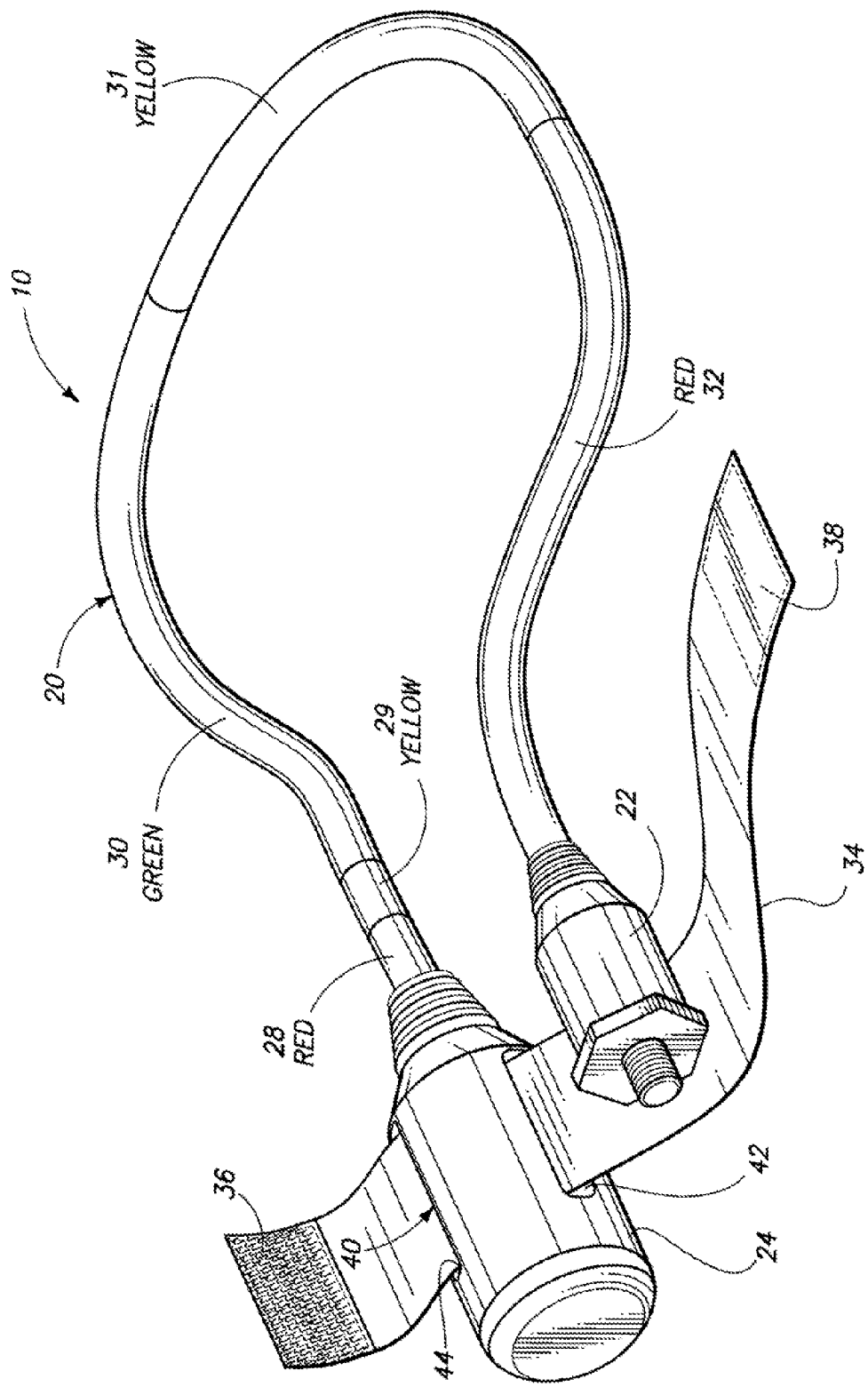
FIG. 2 is a perspective view of the breathing gas supply visual broadcast apparatus of FIG. 1 prior to being coupled to the scuba regulator high pressure port presented in accordance with an embodiment of the present invention.

FIG. 2 is a perspective view of the breathing gas supply visual broadcast apparatus 10 in accordance with an embodiment of the present invention. The visual broadcast apparatus 10 is shown prior to being coupled to the scuba regulator 14 high pressure port (shown in FIG. 1). The visual broadcast apparatus 10 provides an air supply warning apparatus that includes a flexible pressure indicator light tube 20, a pressure sensor unit 22, and a battery unit 24. The sensor unit 22 is threaded into air pressure communication with the high pressure port on a first stage of a scuba regulator 14 on a proximal end and attached using a strap 34 (e.g., using Velcro 36 and 38 to tie the visual broadcast apparatus 10 to the buoyancy compensator), which may be part of the battery unit 24, to the buoyancy compensator hose 26 at a distal end.

The flexible pressure indicator light tube 20 may function to distribute a light source in an elongate light pipe or a flexible transmissive light tube. For instance the flexible, pressure indicator light tube 20 may have a plurality of light sources (e.g., LED, fiber optic and the like) that are activated in unique groupings to generate light selectively within each of a plurality of optically distinct illumination regions, or zones 30, 31 and 32 within the flexible pressure indicator light tube 20. Alternatively, the flexible light tube may be composed of colored zones 30-32 and the light within each zone may be white light. The flexible pressure indicator light tube 20 may provide a user interface and a dive planning system that presents the distributed light source with an array of unique illumination zones 30-32, where each zone 30-32 corresponds to a unique condition, such as a pressure of the gas in tank 16. In some examples the flexible pressure indicator light tube 20, can include illumination zones 28, 29, in addition to illumination zones 30, 31, 32.

According to one embodiment, visual broadcast apparatus 10 may use a flexible pressure indicator light tube 20 where each zone 30-32 correlates with a unique condition, or pressure, of gas in the tank 16. More particularly, a green illumination pattern is provided within zone 30; a yellow illumination zone is provided within zones 29 and 31, and a red illumination pattern is provided within zones 28 and 32. Green illumination zone 30 is provided, in use, along an anterior position of a diver and indicates a "safety" condition indicating an ample supply of breathing gas, or pressurized air. Yellow illumination zones 29 and 31 are activated together and are present along an anterior position and a superior position, respectively, of a diver. Yellow illumination zones 29 and 31 indicate a "caution" condition indicating a moderate supply of breathing gas, or pressurized air. Red illumination zones 28 and 32 are activated together and are present along an anterior position and a posterior position of a diver. Red illumination zones 28 and 32 indicate a final "danger" zone indicating a low supply of breathing gas, or pressurized air. Further, another mode may be provided where the red illumination zones 28 and 32 flash an "SOS" pattern (e.g., three long flashes followed by three short flashes). Hence, visual broadcast apparatus 10 provides a highly visible means of determining the amount of air remaining in an air tank 16 being worn by a scuba diver 18.

There may be more or less than three zones to indicate various conditions to the diver 18. However, the greater the number of light zones, the busier the flexible, pressure indicator light tube 20 may become making it difficult for a diver 18 to a) remember what each zone is for and b) for a buddy diver or group of divers to discern the status of the diver 18.

As known by scuba divers, a diver should prudently plan his/her dive so there is enough air remaining in the tank in order to ascend to the surface. The deeper a diver goes, the longer the diver has to remain at intermediate depths in order to decompress. At each intermediate level there must be enough air in the tank for the diver 18 to breath. For example, depending on the depth a diver has dove, the diver 18 may have to stage his/her ascent, which may require the diver 18 to remain at various intermediate depths, for example, up to ten minutes. Thus, the visual broadcast apparatus 10 may aid the diver 18 prudently plan when to ascend to the surface. Similarly, the broadcast apparatus 10 may assist a fireman when there is minimal air remaining so he/she may safely exit from, for example, a burning building. The visual broadcast apparatus 10 also may aid a group of divers 62-65 as shown in FIG. 3, to identify when a diver in the group may be running out of air, and thus indicate a time for the group to ascend.

Figure 3:
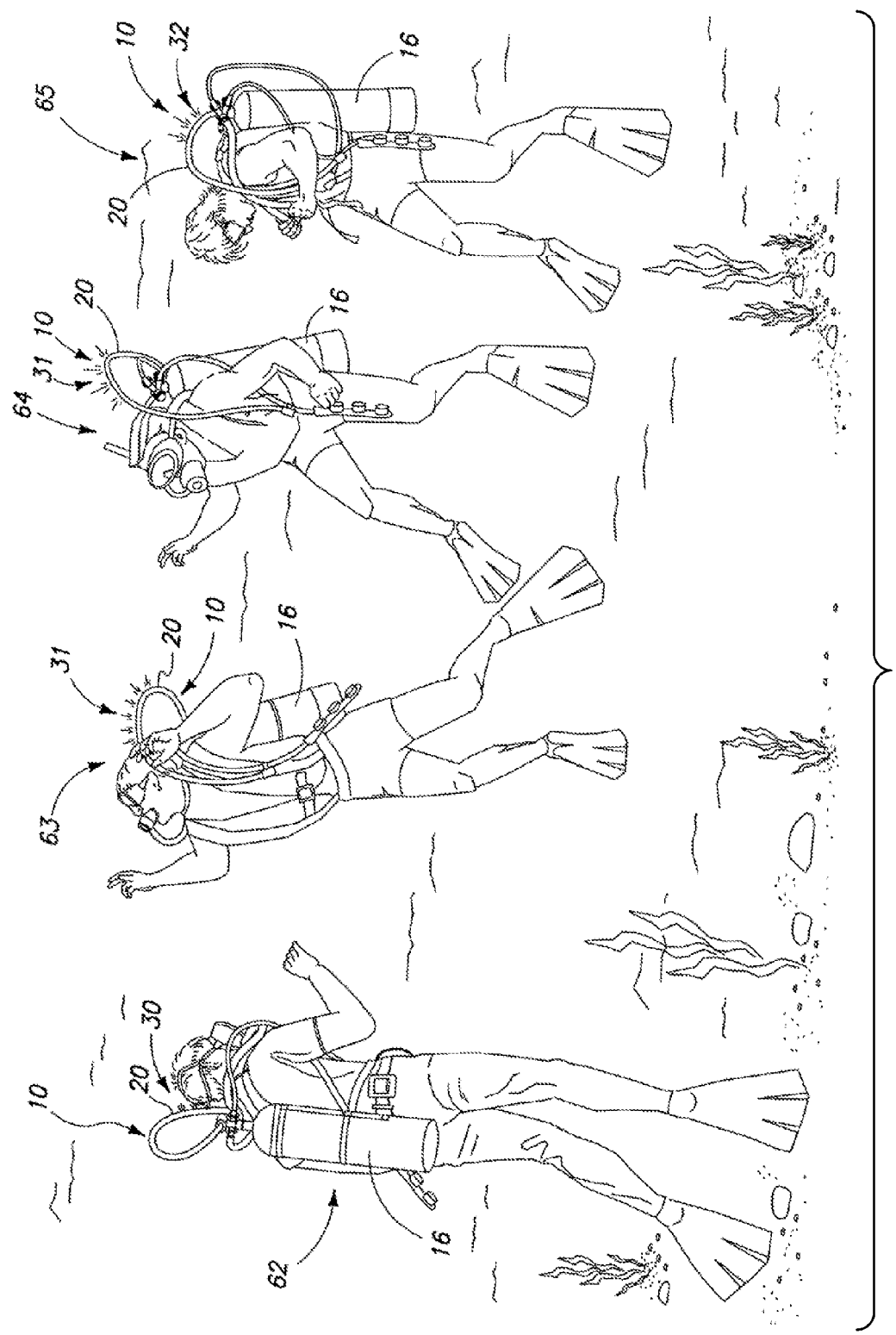
FIG. 3 illustrates a group of divers under the surface of the water using the visual broadcast device in accordance with an embodiment of the present invention.

FIG. 3 illustrates a group of divers under the surface of the water using the visual broadcast device 10 in accordance with an embodiment of the present invention. Specifically, a scuba diving instructor 62 is underwater with a class of scuba diving students 63-65 each having the visual broadcast device 10 used in an embodiment of the present invention. Optionally, instructor 62 could be a scuba diving guide. Diver 62 is able to monitor air supply pressure in tank 16 for each of divers 63-65, as well as his own. Likewise, any other diver can monitor the air supply pressure within tank 16 of divers remaining within a visible range of a respective flexible, pressure indicator light tube 20 on a visual broadcast device 10. Both visual and acoustic signals may be used to alert the divers 62-65 to a condition of the gas supply in the tank 16.

Visual signals may be provided by light sources positioned in the flexible, pressure indicator light tube 20 as discussed above and acoustic signals may be provided by acoustic emitters located in a battery housing 24 or a sensor housing 22 to be further discussed below. For example, Diver 62 may have the lights illuminated in zone 30 a green color that is visually displayed by hose 20. Divers 63 and 64 each may have the lights in zone 31 illuminated a yellow color that is visually displayed by each of their respective hoses 20. Diver 65 may, for example, have the lights in zone 32 illuminated a red color that is visually displayed by hose 20. Furthermore, the lights in zones 30, 31 and 32, in addition to displaying unique colors, also display light in unique regions along hose 20. Accordingly, divers in low light conditions or even color-blind divers can still discern which condition is being displayed even if they cannot discern the particular color being displayed. For instance, lights illuminated in zone 30 indicate a safe condition; whereas lights illuminated in zone 32 indicate a dangerous condition. Further, optionally, instead of scuba divers, the visual broadcast device 10 may be attached to a self-contained breathing apparatus worn by firefighters or other types of emergency personnel and rescue workers. For instance, firefighters may be inside a burning building where visibility is limited and air pressure monitoring is critical, and the visual broadcast apparatus 10 broadcasts the remaining gas in a tank to the firefighter and his/her companions.

Figure 4:
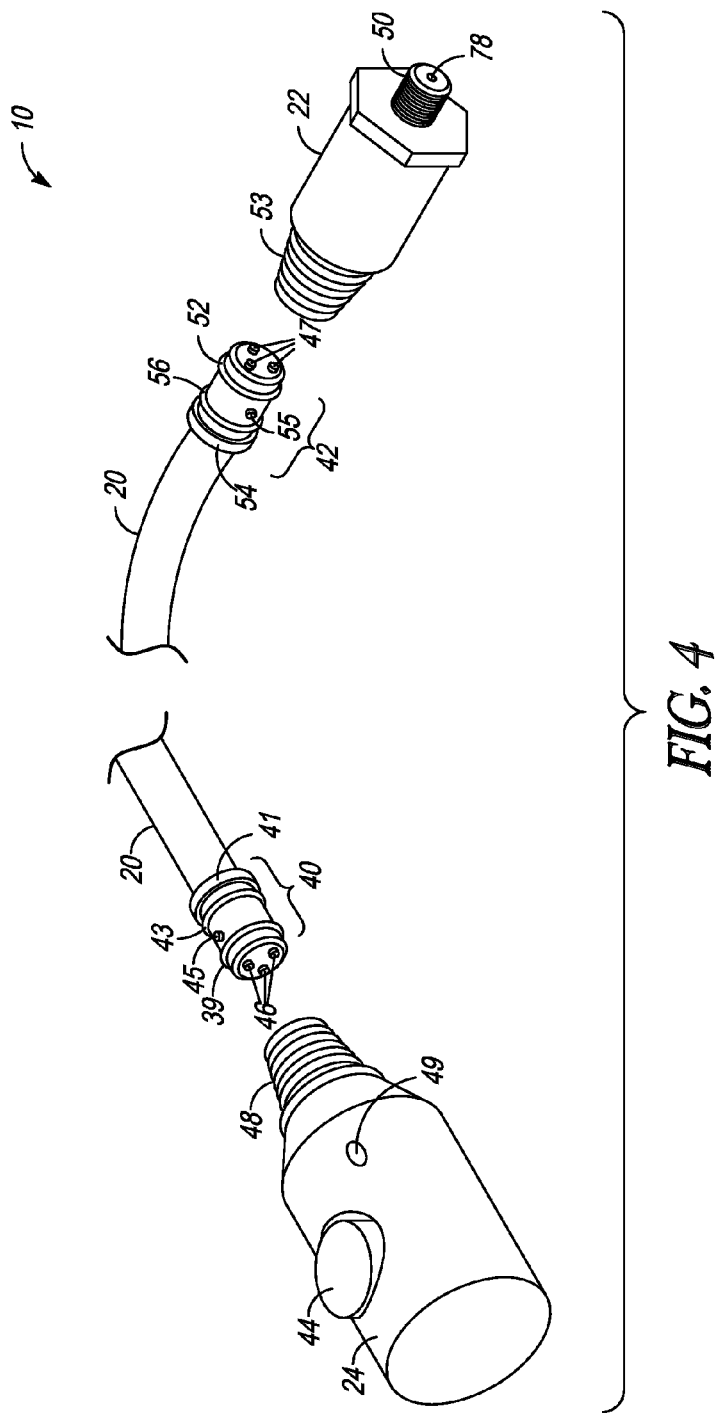
FIG. 4 illustrates the breathing gas supply visual broadcast apparatus of FIG. 2 as multiple "plug-n-play" pieces formed in accordance with an embodiment of the present invention.

FIG. 4 illustrates the breathing gas supply visual broadcast apparatus 10 of FIG. 2 as multiple "plug-n-play" pieces formed in accordance with an embodiment of the present invention. As shown in FIG. 4, the apparatus 10 may be manufactured as three distinct pieces, for example, a battery unit 24, a flexible, pressure indicator light tube 20, and a pressure sensor unit 22. Alternatively, the visual broadcast apparatus 10 (e.g., battery unit 24, flexible, pressure indicator light tube 20, and pressure sensor unit 22) may be manufactured as one piece.

Figure 43:
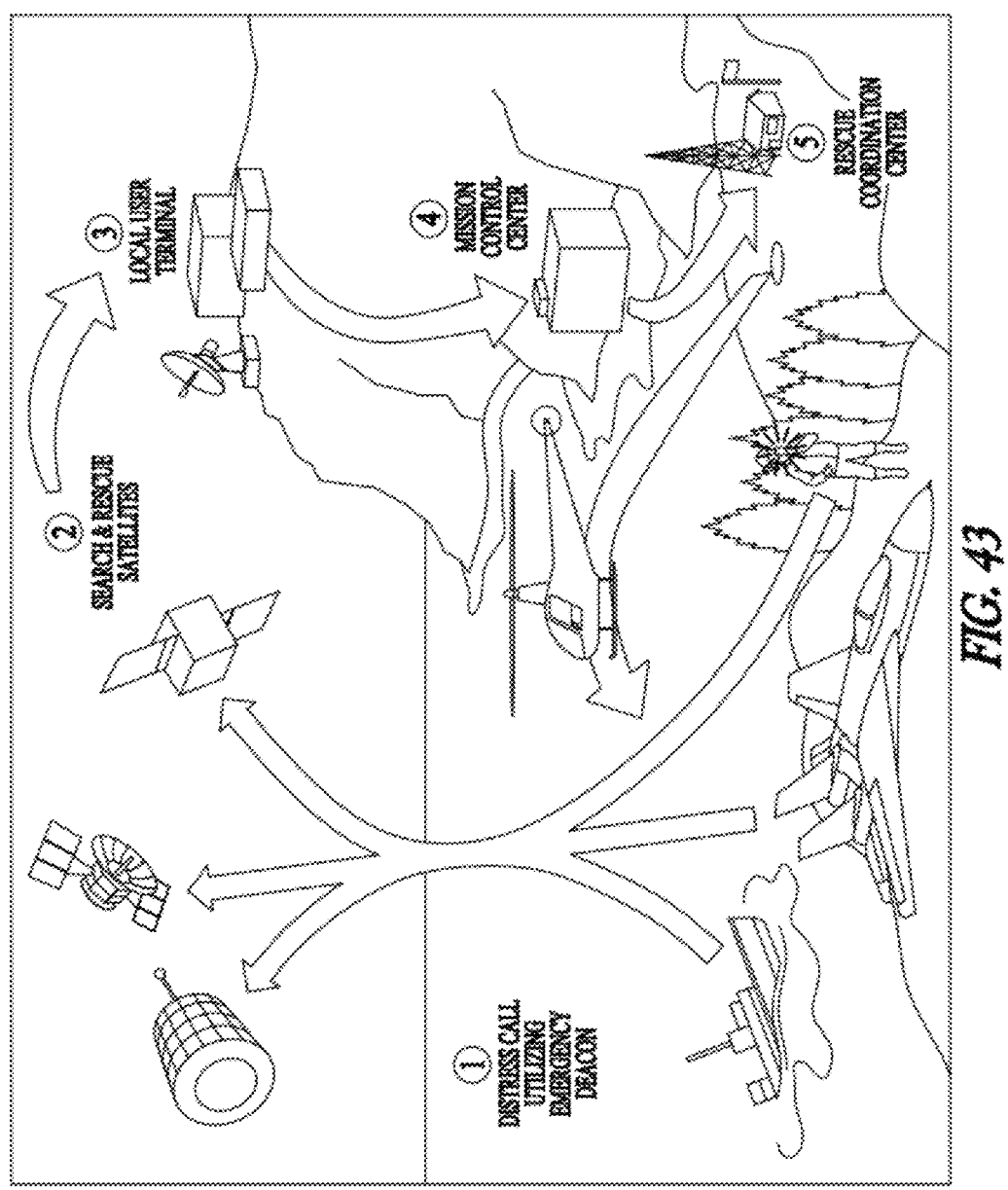
FIG. 43 illustrates a sequence of events that may occur when the Emergency Position-Indicating Radio Beacon (EPIRB) is activated in accordance of an embodiment of the invention.

The battery unit 24 has a switch 44 that may control the modes of the apparatus 10 (e.g., self-test, battery check, activating a Emergency Position-Indicating Radio Beacon (EPIRB), controlling light illumination, such as dimming lights, and the like). For example, if the diver selects the EPIRB setting on switch 44 a series of events as shown in FIG. 43 may occur resulting in a search and rescue operation. The switch 44 may be a rotary switch, a toggle switch, a push-button switch, an optical switch such as an infrared light source, an interrupt switch, and the like. Further, the battery unit 24 may include an attachment hole 49 for diver 18 to attach a device. The battery unit 24 further includes a port 48 that accepts the flexible, pressure indicator light tube 20. The flexible, pressure indicator light tube 20 has a connector 40 on a proximal end and a connector 42 on the distal end. The port 48 includes terminals (not shown) within the port 48 that couple to connector points 46 (e.g., power, ground, communication points) located on the end of connector 40. When the shoulder 41 of connector 40 couple/engages port 48 an electrical connection may be made with connector points 46 to a main controller board 128 containing a microcontroller 138 (shown in FIG. 8) and a battery 108 (shown in FIG. 5), as described below. Locking mechanism 45 along with O-rings 39, 43 (e.g., rubber, polyvinylchloride (PVC), vinyl, fluorocarbon, nitrile, silicon rubber, and the like) and shoulder 41 ensure that connector 40 and port 48 are tightly coupled together to provide a water-proof seal to withstand scuba-diving pressures (e.g., 150 pounds per square inch (psi) to a maximum of 4350 psi). The shoulder 41 stops or prevents the flexible, pressure indicator light tube 20 from being inserted too deeply into port 48, and, thereby, preventing damage to the battery unit 24.

The length and flexibility of the flexible, pressure indicator light tube 20 permits the visual broadcast device 10 to freely move in the water, and to be manipulated into a desired position by the diver 18 or another observe, such as an instructor. Flexible, pressure indicator light tube 20 is formed of flexible and transparent or translucent material (e.g., such as a light-transmissive plastic, rubber, TEFLON and the like), and has sealed therein light emitting diodes (LEDs) or other suitable light sources, such as fiber optic elements, to provide a visual indication of the pressure of the air in the air tank 16. The LEDs may, in an embodiment, be sealed in place using clear silicon or a like material. One exemplary length for the flexible, pressure indicator light tube 20 may be thirty inches. Other lengths of the flexible, pressure indicator light tube 20 are also suitable depending upon the size of the individual person, for example, a child may have a flexible, pressure indicator light tube 20 that is twenty-four inches in length; whereas, an adult over six feet tall may have a flexible, pressure indicator light tube 20 that is thirty-six inches in length.

The length and flexibility of the flexible, pressure indicator light tube 20 permits the visual broadcast device 10 to freely move in the water, and to be manipulated into a desired position by the diver 18 or another observe, such as an instructor. Flexible, pressure indicator light tube 20 is formed of flexible and transparent or translucent material (e.g., such as a light-transmissive plastic, rubber, TEFLON and the like), and has sealed therein light emitting diodes (LEDs) or other suitable light sources, such as fiber optic elements, to provide a visual indication of the pressure of the air in the air tank 16. The LEDs may, in an embodiment, be sealed in place using clear silicon or a like material. One exemplary length for the flexible, pressure indicator light tube 20 may be 30 inches. Other lengths of the flexible, pressure indicator light tube 20 are also suitable depending upon the size of the individual person, for example, a child may have a flexible, pressure indicator light tube 20 that is 24 inches in length; whereas, an adult over six feet tall may have a flexible, pressure indicator light tube 20 that is 36 inches in length.

As discussed below with reference to FIGS. 14, 15, 16 below, light sources may be individual LEDs. The LEDs are electrically interconnected by conductive wiring 131 to electrical circuitry in the sensor unit 22 and circuitry in the battery unit 24. The LEDs may be illuminated in a manner to provide a bright, easily visible and chromatically distinguishable indication of air pressure in the tank to the diver and others nearby. The light source, (e.g., LEDs, fiber optics, lasers, electroluminescence, tritium, tritium and phosphor combination, flexible neon, lamps with various gases such as neon, argon, mercury vapor, and/or phosphors doped to provide various colors that may be filled in the various zones of the tube, and the like) may be used to generate three unique illumination patterns having three unique colors: green, yellow, and red. Any colors may be selected for any particular zone 30-32. Patterns may include all the zones 30-32 (shown in FIG. 2) being illuminated at one time, each zone 30-32 individually illuminated, zones 30-32 flashing (e.g., turning the lights on and off with, for example, a one second interval in between) in pre-determined patterns, two zones illuminated (e.g., zones 30 and 31) and one zone not illuminated (e.g., zone 32) and the like. In the case where gases are used to illuminate the flexible, pressure indicator light tube 20, each zone may be in individual unit and each unit may be able to be connected together, as shown in FIG. 4.

The sensor unit 22 includes a threaded portion 50 that is threaded into the high pressure port of the regulator 14 (shown in FIG. 1) and includes a channel 78 for gas to enter a chamber (shown in FIGS. 11 and 12) to measure the pressure within the tank 16. The sensor unit 22 further includes a port 53 that accepts connector 42 attached to the distal end of the flexible, pressure indicator light tube 20. Similar to connector 40, connector 42 has a connector points 46 (e.g., power, ground, communication points) located on the end of connector 42, a locking mechanism 55, O-rings 52, 56 and a shoulder 54. When the shoulder 54 couple/engages port 53, an electrical connection may be made with connector points 47 to a pressure sensor board (shown in FIG. 14), as described below. Locking mechanism 55 along with O-rings 52, 56 (e.g., rubber, PVC, vinyl, fluorocarbon, nitrile, silicon rubber, and the like) and shoulder 54 ensures that connector 42 and port 53 are tightly coupled together to provide a water-proof seal to withstand scuba-diving pressures (e.g., 150 psi to 4350 psi). The shoulder 54 also functions to prevent the flexible, pressure indicator light tube 20 from being inserted too deeply into port 48 (e.g., functions as a stop) and, thereby, preventing damage.

Figure 5:
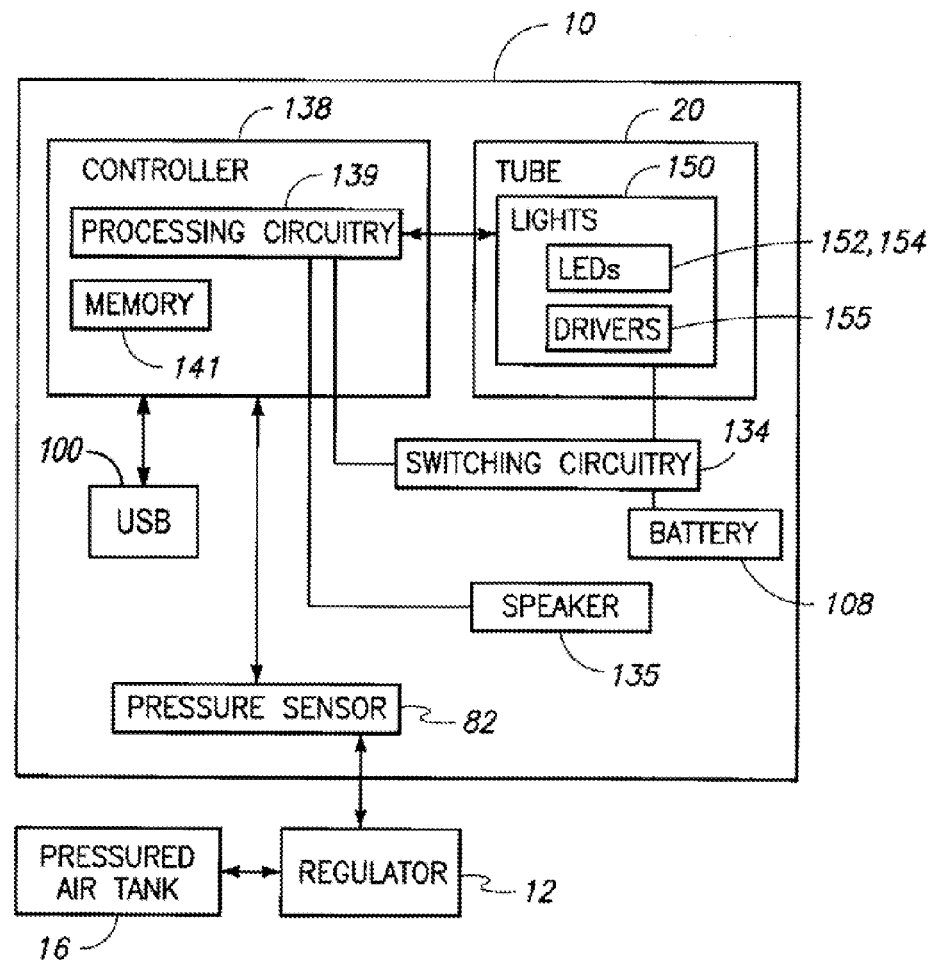
FIG. 5 illustrates a block diagram for the visual broadcast device of FIG. 2 coupled onto a regulator of a pressurized air tank (shown in FIG. 1) presented in accordance with an embodiment of the present invention.

FIG. 5 illustrates a block diagram for the visual broadcast device 10 as coupled onto a regulator 12 of a pressurized air tank 16 presented in accordance with an embodiment of the present invention. More particularly, visual broadcast device 10 includes a controller 138 having processing circuitry 139 that communicates with lights 150 provided within a flexible, pressure indicator light tube 20. The controller 138 (also referred to herein as a microcontroller, processor module, or processor unit) typically includes a microprocessor, or equivalent control circuitry and is designed specifically for controlling the illumination of lights and the generation of sound based on a pressure condition in a gas tank may further include RAM or ROM memory, logic and timing circuitry, state machine circuitry, and I/O circuitry. Typically, the controller 138 includes the ability to process or monitor input signals (data) as controlled by a program code stored in memory 141.

The processing circuitry 139 shall retrieve any software program residing in memory 141 and execute the program to monitor pressure in the tank 16 which selectively turn on and off a zone of lights 30, 31, and 32 (as shown in FIG. 2) based on the measured pressure. The controller 138 also communicates through a USB port 100. The USB port 100 may be used to load a software program the visual broadcast device 10, change factory settings, run a self-test, download software and results onto a display, and the like. Controller 138 also communicates with the pressure sensor 82, which delivers a signal that is detected at regulator 12 correlating with a detected pressure in air tank 16.

Controller further includes memory 141. Memory 141 may store a software program, a pressure reading, a time of the pressure reading, maximum pressure, battery voltage, any errors, a selected mode, light illumination levels, what light zones were illuminated, and at what time the zones are illuminated, activating an Emergency Position-Indicating Radio Beacon (EPIRB), emergency locating transmitters (ELT), personal locator beams (PLB), recording the time of activation of emergency transmitters, recording global position information (GPS), historical information, and the like.

The lights 150 may be at least one of a diode, a light emitting diode (LED), a halogen light source, an infrared light source, a neon light source, a tungsten halogen light source, a deuterium light source, a mercury-argon light source, a xenon light source, and a fiber optic light source. According to one embodiment, the lights 150 may be arrays of various light emitting diodes (LEDs) 152, 154 (e.g., high intensity LEDs, super-bright LEDs, red LEDs, yellow LEDs, green LEDs, white LEDs, blue LEDs, surface mount LEDs, and the like), each LED 152, 154 driven by a driver 155. Alternatively, driver 155 may not turn on/off LEDs 152, 154; for instance, the controller 138 may include driver circuitry that controls turning the LEDs 152, 154 on/off.

Switching circuitry 134 (e.g., a rotary switch, a toggle switch, a push-button switch, an optical switch such as an infrared light source, an interrupt switch, and the like), communicates with the processing circuitry 139 in controller 138 to enable and disable groups of lights 150 within the flexible, pressure indicator light tube 20 in selected patterns that cover certain select illumination zones. Switching circuitry 134 also initiates power on and power off between the battery 108 and the lights 150.

Processing circuitry 139 also communicates with a speaker 135. Controller 138 can direct speaker 135 to trigger an audible alarm based upon a condition of breathing gas that is detected by a pressure sensor 82 (e.g., strain gauge, piezoelectric, mechanical sensors, linear potentiometer, LVDT, and the like) in communication with regulator 12. For instance, an audible alarm may be activated upon the sensor 82 detecting changes in pressure in the tank 16. For example, as the pressure changes in the tank 16 and the illuminated LED colors change from one zone to the next zone (e.g., green to yellow to red), an audible sound may be generated (e.g., beeps). The sound may be of different frequencies, different patterns, different sounds, or combinations thereof or a preselected pattern to warn the user that a change in pressure has occurred and inform the user the amount of air pressure remaining in the tank. For instance one frequency may be used to generate an audible sound when in the green LEDs are illuminated, and another different frequency of sound may be used when the yellow LEDs are illuminated. The pattern may be any pattern of sound selected to catch the attention of the user and indicate a potentially harmful condition. Optionally, the audible alarm may sound an "SOS" signal (e.g., Morse code distress signal (e.g., three short dashes, three long dashes, and three short dashes) to indicate a dangerous condition where the diver needs assistance. Alternatively, in an emergency situation, the audible alarm may also sound a sequentially rising pitch starting at a low frequency and going to a higher frequency.

Figure 6B:
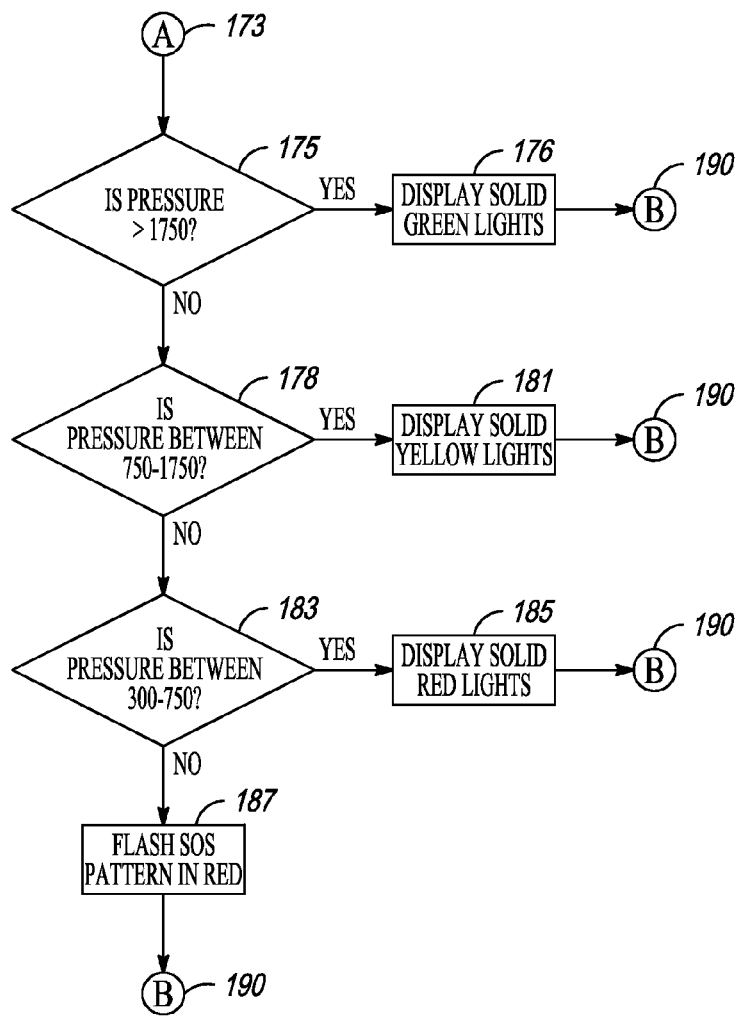

FIGS. 6A and 6B illustrates a process 160 for detecting a pressure in a gas tank 16 (shown in FIG. 1) illuminating zones 30-32 (shown in FIG. 2) within the visual broadcast device 10 formed in accordance with an embodiment of the present invention. The process 160 maybe implemented by one or more devices and systems discussed above in connection with FIGS. 1-5. At 162, the process commences by turning on the power by using the switch 44 (shown in FIG. 4).

At 164, a self-test is performed, each zone 30-32 is checked to verify the lights illuminate and broadcast, a level of pressure is measured to determine the amount of air in the thank, and a verification may be performed that no error conditions exist.

At 166, the battery voltage may be measured to verify that the batteries are at a pre-determined threshold voltage. For example, if "AA" batteries are used, the battery voltage is at least a 2.0 volts per battery. Alternatively, if "AAA" batteries are used, the battery voltage is at least 1.0 volts per battery. If the measured battery voltage is below the threshold value, process flow continues to 168. At 168, lights in zone 31 (shown in FIG. 2) may be illuminated to flash, for example, a yellow color. Alternatively, the lights in zones 29 and 31 (shown in FIG. 2) may be illuminated to flash synchronously a yellow color. Optionally, the lights in zone 29 may be turned on to remain illuminated a solid yellow color. If the batteries are within the required threshold value, process 160 continues to 171.

At 171 the pressure sensor 82 measures the gas pressure in the tank 16. The measured pressure may be stored in memory 141. In one embodiment, the pressure sensor 82 continuously measures the pressure and stores the recorded pressure in memory 141. In an alternative embodiment, the pressure sensor 82 measures the pressure when commanded by microcontroller 138.

At 172, the measured pressure is compared to a pre-determined value. The pre-determined value may be selected on the basis of whether the diver is a novice scuba diver or a professional scuba diver. Alternatively, the pre-determined values may correspond to values required by certification agencies. The process 160 continues to step 173 and then to step 175.

At 175, the measured pressure is compared to a predetermined value of 1750 psi. If the measured pressure is greater than 1750 psi the process continues to 176, where the lights in zone 30 (shown in FIG. 2) may be illuminated in a solid green color to indicate a "safety" condition that the tank 16 contains an ample supply of breathing gas, or pressurized air. The process then continues to step 190. If the measured pressure is less than 1750 psi, the process continues to step 178.

At 178, the measured pressure is compared to a predetermined value range of pressure between 750 psi and 1750 psi. If the measured pressure is within the range of 750 psi and 1750 psi, the process continues to 181, where the lights in zone 31 (shown in FIG. 2) may be illuminated to provide a solid yellow color to indicate a "caution" condition that the tank 16 contains a moderate supply of breathing gas, or pressurized air. The process then continues to step 190. If the measured pressure is less than 750 psi, the process continues to step 183.

At 183, the measured pressure is compared to a predetermined value range of pressure between 300 psi and 750 psi. If the measured pressure is within the range of 300 psi and 750 psi, the process continues to 185, where the lights zone 32 (shown in FIG. 2) may be illuminated to provide a solid red color to indicate a final "danger" zone that the tank 16 contains a low supply of breathing gas, or pressurized air. The process then continues to step 190. If the measured pressure is less than 300 psi, the process continues to step 187.

At 187, the flexible, pressure indicator light tube 20 may flash a "SOS" pattern using the red lights in zone 32 as well as continuously flash the light in area 28 (shown in FIG. 2). The process then continues to step 190 to verify the battery voltage in step 166.

Throughout process 160, if the battery voltage is measured to be below the required threshold, a yellow light will continue to flash. In one embodiment, when the SOS pattern is triggered and the battery is also measured to be below the threshold value, the lights may be illuminated to first flash yellow then flash red then flash yellow, etc., in an alternating pattern.

Figure 7:
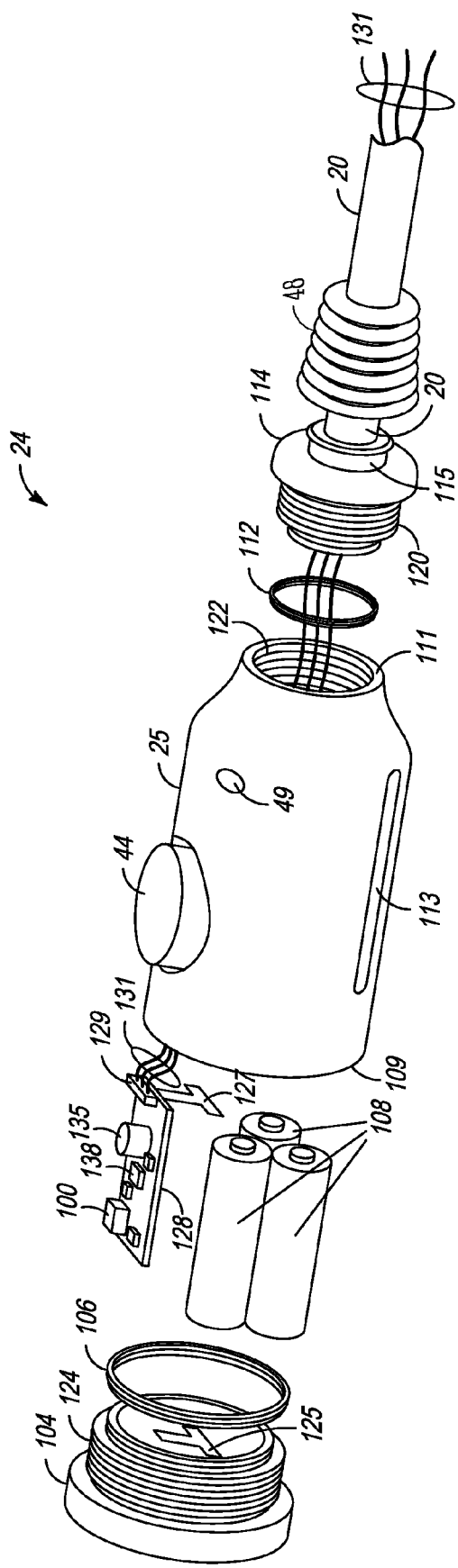
FIG. 7 illustrates an enlarged exploded perspective view of a battery unit for the visual broadcast apparatus of FIG. 2 formed in accordance with an embodiment of the present invention.

FIG. 7 illustrates an enlarged exploded perspective view of the battery unit 24 for the visual broadcast apparatus 10 (shown in FIG. 2) formed in accordance with an embodiment of the present invention. The battery unit 24 includes a end cap 104, an O-ring 106, a plurality of batteries 108, a main controller board 128, a battery housing 25 having a female thread (not shown), a switch 44, a slot 113 for a strap, an attachment hole 49, and a plurality of female threads 122, an O-ring 112, a pressure cap 114 having a series of male threads 120 and a lip 115 and strain relief 48. O-rings 106 and 112 prevent water from entering the battery housing 25. Strain relief 48 may be configured to decrease the stress and strain caused by the movement of the flexible, pressure indicator light tube 20, and may be configured to prevent the flexible light tube from detaching from the battery housing 25.

The end cap 104 includes a battery clip 125 and is configured to mechanically engage the plurality of batteries 108 in order to complete an electrical circuit to provide electrical power to the visual broadcast apparatus 10. The end cap 104 may be manufactured from a hard plastic material.

The proximal end 109 of the battery housing 25 is configured to mechanically accept the end cap 104. The end cap 104 has male threads 124 that accept the O-ring 106 and together are configured to mechanically couple into the proximal end 109 of the battery housing 25 to form a tight, water-proof seal.

The main controller board 128 includes a USB port 100, a speaker (e.g. beeper) enclosed within a resonant chamber 135, a connector 129 electrically connected to a plurality of wires 131, and a battery clip 127. The controller board 128 also includes a microcontroller 138, processing circuitry 139, and memory 141 as described above in relation to FIG. 5. The plurality of wires 131 may provide a power signal, a ground signal, and a communications signal to the lights 150, switch 44, and sensor board 82. The number of wires may be increased or decreased based on changes in microcontroller technology. For example, in an alternative embodiment, two wires may be used (e.g., a ground signal and a power signal). The communications, in such an embodiment may be provided by providing communication information over the power wire. The plurality of wires 131 from the main controller board 128 may be "strung" through the battery housing 25, through the O-ring 112, through the pressure cap 114, through the strain relief 48 and through flexible, pressure indicator light tube 20 to connect to the lights 150 and the pressure sensor board 196 (shown in FIG. 10).

In order to provide electrical power to the visual broadcast apparatus 10, the batteries 108 are configured to be in contact with battery clips 125 and 127. The batteries 108 may be "AAA" size batteries or "AA" size batteries. The type of batteries 108 may be nickel-hydride, lithium, alkaline, zinc, nickel-cadmium, nickel metal hydride, and the like. FIG. 7 depicts three batteries. At least two batteries may be connected to provide power and one battery may be used as a spare. Alternatively, all three batteries 108 may be used to provide power.

The main controller board 128 and the batteries 108 fit inside the battery housing 25. The distal end 111 of the battery housing 25 mechanically accepts the pressure cap 114. The pressure cap 114 has male threads 120 that accept the O-ring 112 and together mechanically engage into the distal end 111 of the battery housing 25 to form a tight, water-proof seal. In an optional embodiment, the strain relief 48 and pressure cap 114 may have a series of barbed threads that engage and lock the flexible, pressure indicator light tube 20 to permanently affix the flexible, pressure indicator light tube 20 to the pressure cap 114.

Figure 8:
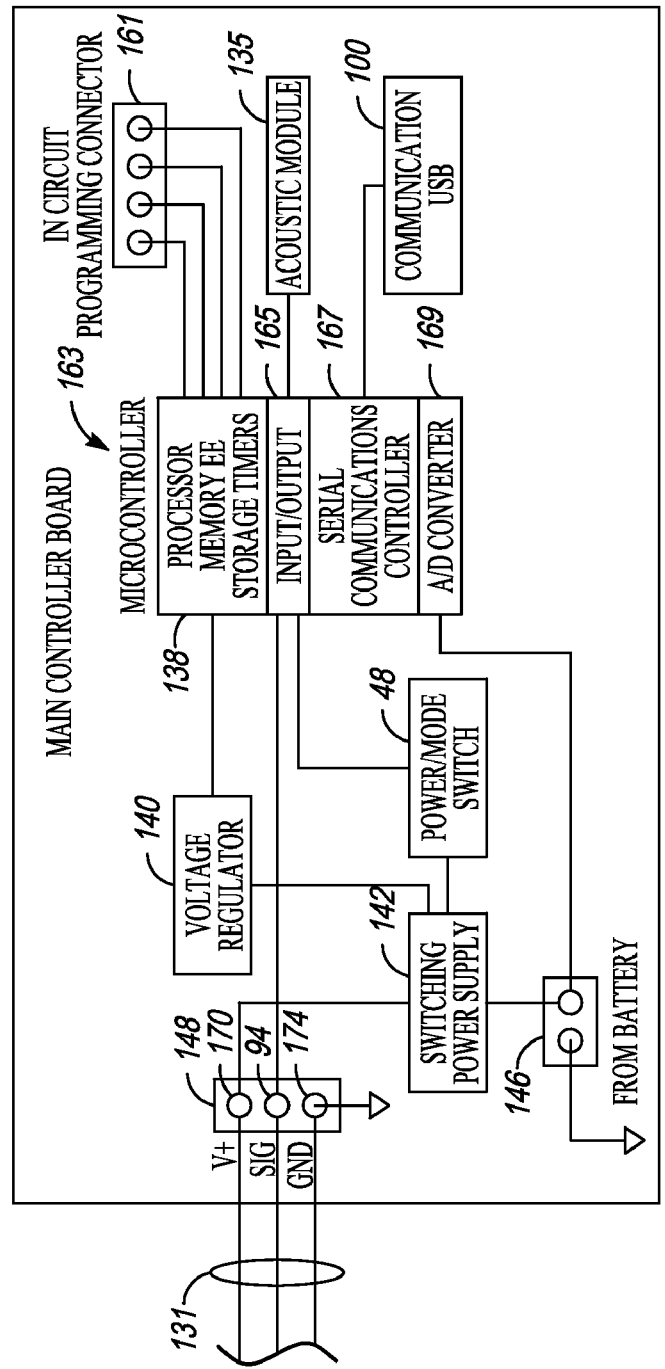
FIG. 8 illustrates a block diagram of a main controller board utilized in accordance with an embodiment of the invention.

FIG. 8 illustrates a block diagram of a main controller board 128 utilized in accordance with an embodiment of the invention. The main controller board 128 includes a microcontroller 138, an acoustic module 135, a communications USB port 100 a voltage regulator 140, a switching power supply 142, and a power/mode switch 44. In addition, the main controller board 128 includes connectors 146, 148, and 161. Connector 146 provides a connection to the battery 108 (shown in FIG. 7). Connector 161 may be an in circuit programming connector to be used by a programmer to program software, makes software changes (e.g., make software patches, updates, revisions and the like) while storing the temporary programming in the EE storage. Connector 148 provides a power signal 170, an electrical ground 174, and a communications signal 94 to the visual broadcast apparatus 10. Wires 131 are attached to the power (e.g., V+), ground (e.g., GND) and signal (e.g., SIG) lines of connector 148, and the wires 131 may be connected through the visual broadcast apparatus 10 to the individual LED driver boards (shown in FIGS. 14, 15, 16, 17 and 18) or to individual arrays of lights (shown in FIGS. 19, 20, 21, and 22). In an alternative embodiment, the circuit board 128 wires (not shown) may be hardwired to connectors 146, 148, and 161 by soldering the wires into pre-drilled holes into the circuit board 128.

The microcontroller 138 (also referred to herein as a processor module or unit) typically includes a microprocessor, or equivalent control circuitry, is designed specifically for controlling the measurement of pressure and illumination of lights and may further include RAM or ROM memory, logic and timing circuitry, state machine circuitry, and I/O circuitry. Typically, the microcontroller 138 includes the ability to process or monitor input signals (e.g., data such as, for example, ASCII data) received from a sensor and as controlled by a program code stored in memory. Among other things, the microcontroller 138 receives, processes, and manages storage of digitized data from the pressure sensor board and LED modules. The microcontroller 138 may also analyze the data, for example, in connection with determining the remaining amount of air in a gas tank. The microcontroller 138 may be commercially available microcontroller and, for example, may be provided by Microchip Technology, Inc., Chandler, Ariz.

Figure 9:
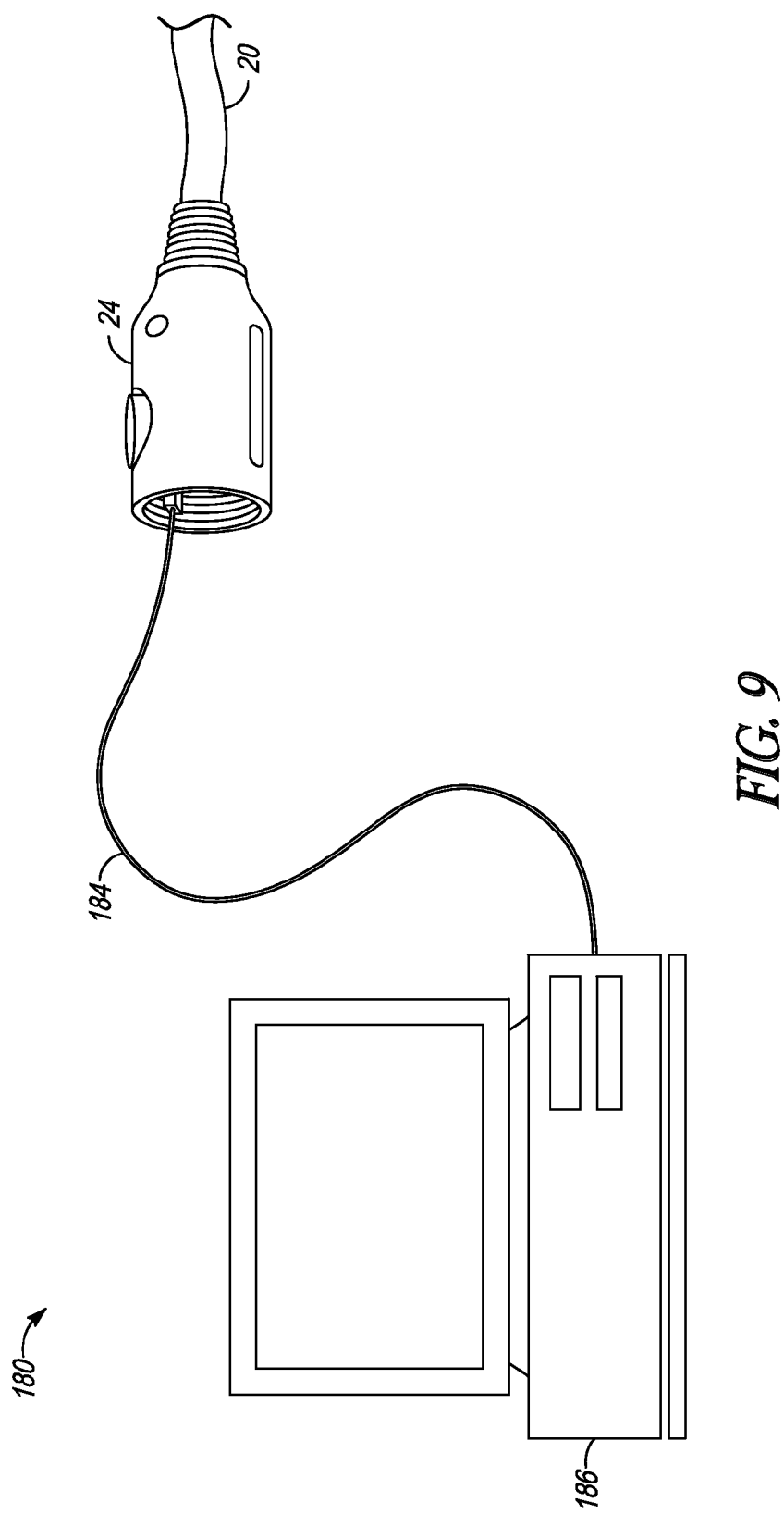
FIG. 9 illustrates connecting the USB port of the main controller board in the battery unit to a personal computer utilized in accordance with an embodiment of the invention.

The microcontroller 138 includes a memory module 163, an input/output module 165, a serial communications controller 167, and an analog-to-digital (A/D) converter 169, and may further include electrically erasable (EE) storage and timers. The timers may be utilized to turn the lights 150 on/off, as well program any type of patterns to illuminate the lights (e.g. flashing red for dangerous condition, a SOS pattern and the like). The serial communications controller 167 may be connected to the USB 100 to communicate with a personal computer 186 (as shown in FIG. 9) via a cable 184 to program various settings for the visual broadcast apparatus 10. Alternatively, a PDA, a cell phone, a laptop, a custom programmer, and the like may be used to connect to the USB 100. For instance, the USB 100 may allow a programmer to change pressure thresholds, change patterns for the lights to turn on/off, change settings for the acoustic module (e.g., programming different frequencies for the acoustic module to sound for different pressure conditions) or change self-test settings, upload a new version of software, and the like.

The microcontroller 128 has input/output pins 165. The input/output 165 may be connected to the acoustic module 135. Upon detecting changes in pressure the microcontroller 138 may send a signal to the acoustic module 135 via the input/output 165 to generate a sound that can be heard by the diver 18 (e.g., a beep, a series of beeps, a long beep, an SOS signal, and the like). In one embodiment, the acoustic transducer may be provided by CUI Inc., Tualatin, Oreg. Any type of acoustic device may be used. For instance, in applications, other than scuba diving, such as search and rescue the sound must have a volume that is loud enough to warn the wearer of the visual broadcast apparatus 10 over any background noise.

Microcontroller 138 may also be connected to a power/mode switch 44 via input/output module 165. The power/mode switch 44 may be connected to the switching power supply that is connected to the battery 108 via connector 146. As described in FIG. 4, the switch 44 may control the modes of the apparatus 10 (e.g., turning power on/off, self-test, battery check, activating a Emergency Position-Indicating Radio Beacon (EPIRB), controlling light illumination, such as dimming lights, and the like). The switch 44 may be a rotary switch, a toggle switch, a push-button switch, an optical switch such as an infrared light source, an interrupt switch, and the like. By being connected to the switching power supply 142, switch 44 controls when electrical power may be turned on or off to apparatus 10.

The main controller board 128 provides a power signal 170, an electrical ground 174, and a communications signal 94 to the visual broadcast apparatus 10 via the connector 148 as mentioned above. The power signal 170 may be, for example, +5 volts. The power signal 170 is generated by the voltage from the battery (e.g., the depending on the size of the battery at least 1.0 volts per battery or at least 1.5 volts per battery) being stepped up by the switching power supply 142. The switching power supply 142, as typically known in the art, steps up the voltage from the battery to a +5 volt level. The switching power supply 142 may also be connected to a voltage regulator 140 in order to step-up or step-down the voltage provided by the battery 108 to a voltage level required by the microcontroller 138.

For example, the power supplied by the battery may be in the range from a minimal voltage of 2.0 volts (e.g., two batteries each at a minimum voltage of 1.0 volts) to a maximum voltage of 3.0 volts (e.g., two batteries at their maximum voltage of 1.5 volts each). Various types of batteries may be used as mentioned above. The battery may also be a single rechargeable battery. Optionally, the battery may be custom designed for the apparatus 10 to provide power over longer than typical lengths of time, for example, for military or search and rescue operations.

In order to check the voltage of the batteries 108, the A/D converter 169 may be connected to the connector 146. If the A/D converter 169 measures the batteries 108 voltage to be less than a predetermined threshold value, the A/D converter 169 may inform the microcontroller 138. The microcontroller 138, in turn, may send a communication signal via the input/output module 165 and connector 148 signal line 94 to command the zone 31 (shown in FIG. 2) to illuminate a solid yellow color.

Figure 10:
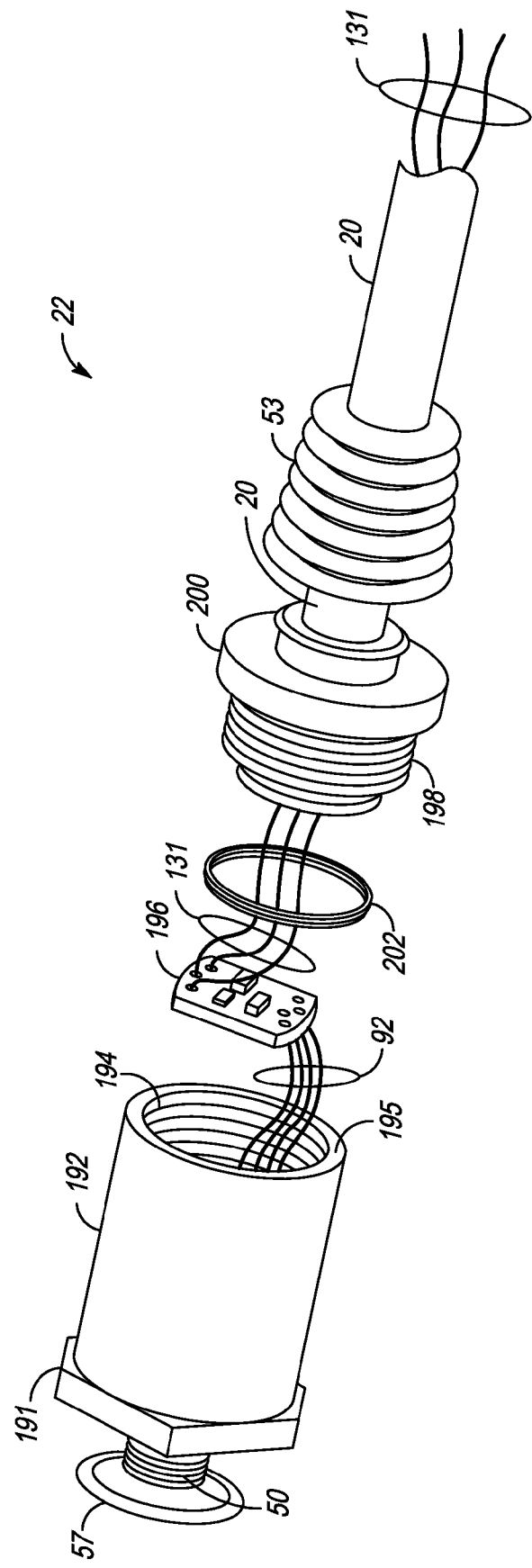
FIG. 10 illustrates an enlarged exploded perspective view of the sensor unit for the visual broadcast apparatus of FIG. 2 formed in accordance with an embodiment of the present invention.

FIG. 10 illustrates an enlarged exploded perspective view of the sensor unit 22 for the visual broadcast apparatus 10 (shown in FIG. 2) formed in accordance with an embodiment of the present invention. The sensor unit 22 includes a thread 50, a nut 191, a sensor housing 192 having female threads 194, a pressure sensor board 196, O-rings 57 and 202, a cap 200, and a strain relief 53. FIG. 10 depicts the pressure sensor board 196 connected by a plurality of four wires 92 that emerge from within the sensor housing 192. The wires 92 are connected from the pressure sensor board 196 to a pressure sensor 82 (shown in FIGS. 11 and 12).

Figure 11:
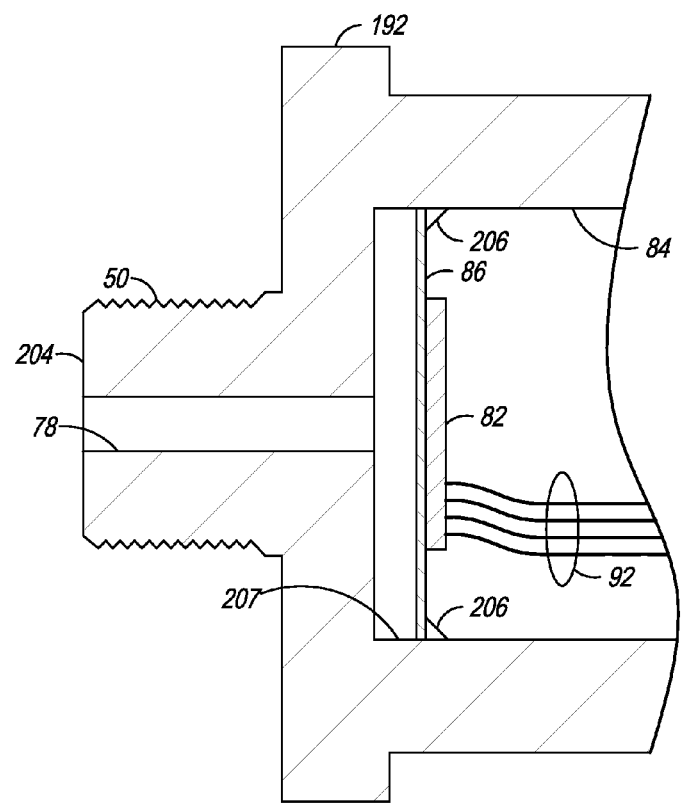
FIGS. 11 and 12 illustrate alternative a pressure sensors utilized in accordance with an embodiment of the invention.
Figure 12:
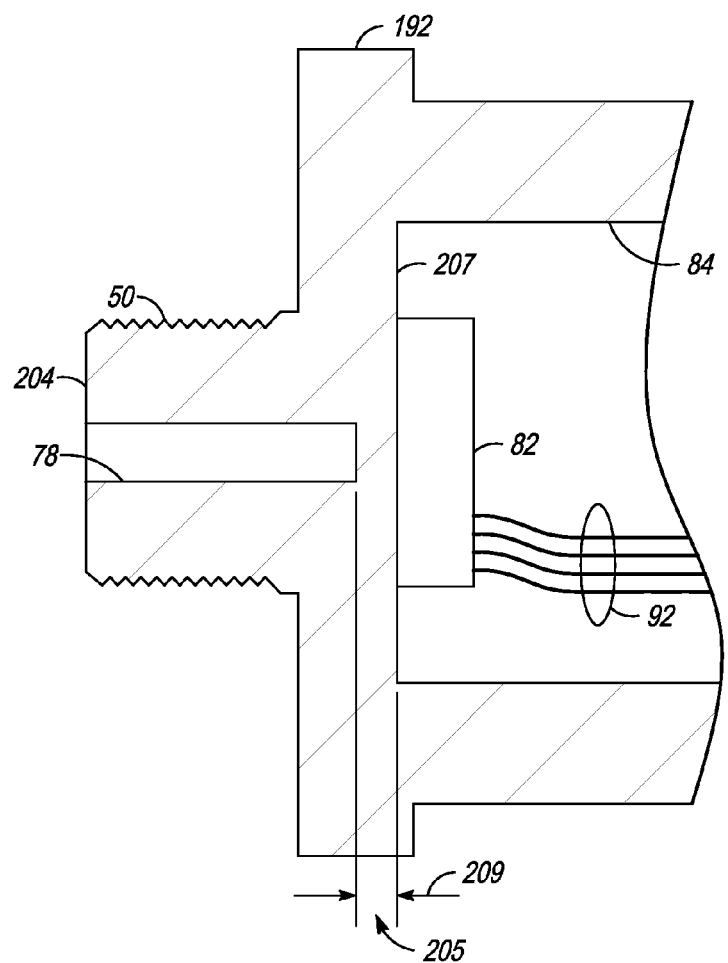

FIGS. 11 and 12 illustrate a centerline sectional view of optional embodiments of a pressure sensor 82 configuration of FIG. 10 utilized in accordance with an embodiment of the invention.

FIG. 11 depicts the sensor housing 192 having port threads 50 that connect to the high pressure port of the regulator 14 (shown in FIG. 1) and a milled chamber 84 containing the sensor 82 and a milled channel 78. The milled channel 78 extends from a proximal end 204 of the sensor housing 192 through the sensor housing to a distal position adjacent to a stainless steel diaphragm 86. In an embodiment, the steel diaphragm 86 may be welded into place against a wall 207 with welds joints 206. The diaphragm 86 moves/flexes as the pressure from the tank 16 changes based on the amount of gas remaining in the tank. For instance, when the tank is full, the pressure against the diaphragm 86 may be 5000 psi. However, when the tank is near empty, the pressure against the diaphragm 86 may be reduced to 300 psi. Therefore, as the diaphragm 86 moves corresponding to the changing pressure, the sensor 82 (e.g., strain gauge that may read from 0 psi to 5000 psi) on the diaphragm 86 sends a signal to the pressure sensor board 196 via the plurality of wires 92. The pressure sensor board 196 sends a signal along the wires 131 to the main controller board 128, which instructs the lights 150 and speaker 135 based on the measured pressure. A disadvantage with such a sensor configuration are the weld joints 206, for as the pressure increases while the diver 18 scuba dives, particles from the weld joint may sublimate and enter the channel 78. These particles may then contaminate the breathable gas from the tank 16. In one embodiment, the steel diaphragm 86 and sensor 82 may be provided by Ashcroft Industrial Pressure Gauges, Costa Mesa, Calif.

FIG. 12 depicts the sensor housing 192 having port threads 50 that connect to the high pressure port of the regulator 14 (shown in FIG. 1) and a milled chamber 84 having a wall 207 on which containing the sensor 82 maybe placed, and a milled channel 78. By placing the sensor 82 on the wall 207, the sensor 82 maybe protected from burst pressure resulting, as well as any moisture from the air tank that is forced into the chamber from the gas tank 16 being turned on (e.g., a droplet of water pressurized at, for example, 3000 psi is like a BB shot into a chamber). In this case, the milled channel 78 extends from a proximal end 204 of the sensor housing 192 through the sensor housing 192 to a distal position adjacent to the chamber 84, but leaving a gap 205. The dimensions of the gap 205 (e.g., length 209) may be selected on the desired pressure to be read. For instance, the length 209 of the gap 205 may be one value, for example, if a maximum pressure of 5000 psi is to be measured; whereas, the length 209 may be of a different value, for example, if the maximum pressure of 1000 psi is to be measured. The sensor 82 measures the pressure when the tank is full (e.g., 5000 psi) and when the tank is near empty (e.g., 300 psi). The sensor 82 sends a signal to the pressure sensor board 196 via the plurality of wires 92 informing the sensor board 196 of the measured pressure. The pressure sensor board 196 sends a signal along the wires 131 to the main controller board 128, which instructs the lights 150 and speaker 135 based on the measured pressure. In one embodiment, the sensor 82 may be provided by Hottinger Baldwin Measurements, Inc., Marlborough, Mass. An advantage of the configuration depicted in FIG. 12 is that the lack of weld joints does not cause any contamination of the breathable air/gas.

Returning to FIG. 10, the pressure sensor board 196 has a plurality of wires 131 that connect to the main controller board 128 (shown in FIGS. 7 and 8) via connector 148 (shown in FIG. 8). The pressure sensor board 196 also includes a microcontroller 210, a voltage regulator 216 and a differential bridge amplifier 218 as described below in relation to FIG. 13. The plurality of wires 131 from the pressure sensor board 196 may provide a power signal, a ground signal, and a communications signal to the main controller board 128. The number of wires 131 may be increased or decreased based on changes in microcontroller technology. For example, in an alternative embodiment, two wires may be used (e.g., a ground signal and a power signal). The communications, in such an embodiment may be provided by providing communication information over the power wire. The wires 131 are strung or threaded through the O-ring 202, pressure cap 200, strain relief 53, and flexible, pressure indicator light tube 20. The wires 131 may correspond to the power (e.g., V+), ground (e.g., GND) and signal (e.g., SIG) lines that may be connected to individual LED driver boards (shown in FIGS. 14, 15, 16, 17 and 18).

FIG. 10, also depicts an O-ringer 57 that provides a tight, water-proof seal when the sensor unit 22 is screwed into the high pressure port of the regulator 14 (shown in FIG. 1) with threads 50. The pressure sensor board 196 fits inside the pressure sensor housing 192. By being placed on the same side of wall 207 as the sensor 82, the pressure sensor board 196 maybe protected from burst air pressure and moisture. The pressure cap 200 has male threads 198 that accept the O-ring 202 and together the O-ring 202 and pressure cap 200 mechanically engage into the distal end 111 of the pressure sensor housing 192 to form a tight, water-proof seal. The flexible, pressure indicator light tube 20 fits inside the strain relief and pressure cap 200. In an embodiment, the strain relief 53 and pressure cap 200 may have a series of barbed threads that engage and lock the flexible, pressure indicator light tube 20 to permanently affix the flexible, pressure indicator light tube 20 to the pressure cap 200.

Figure 13:
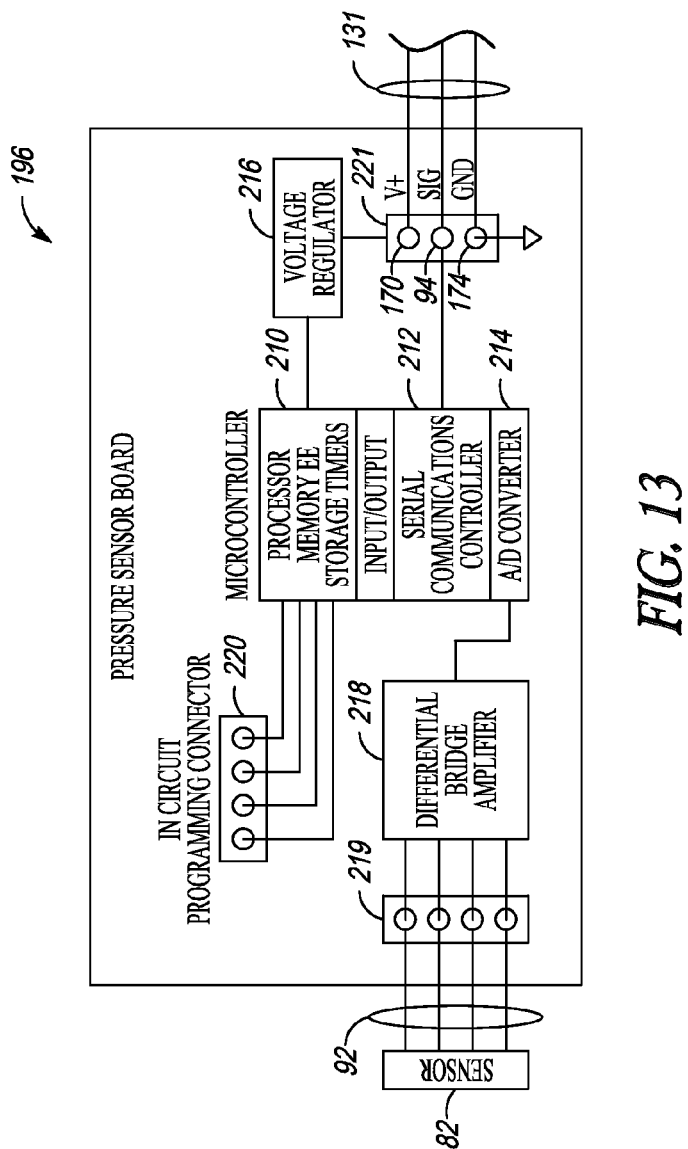
FIG. 13 illustrates a block diagram of a pressure sensor board utilized in accordance with an embodiment of the invention.

FIG. 13 illustrates a block diagram of a pressure sensor board 196 utilized in accordance with an embodiment of the invention. The microcontroller 210 is similar to microcontroller 138 (shown in FIG. 8) and functions as described above. Similarly, voltage regulator 216 steps down or steps up the voltage from the power source (e.g., V+ having a +5 volt supply) to the voltage required by the microcontroller 210. Also, connectors 220 and 221 are similar to connectors 161 and 148 (shown in FIG. 8) as described above. The analog-to-digital (A/D) converter 214 accepts a signal from the differential bridge amplifier that corresponds to a measured pressure value of the gas tank 16. The pressure value may be provided from the A/D converter 214 to the serial communications controller 212 and may be transmitted via the signal line 94 to the main controller board 128 (shown in FIG. 8). In addition, as previously discussed the power (e.g., V+), ground (e.g., GND) and signal (e.g., SIG) lines 131 are connected to the main controller board 128 as well as individual LED driver boards (shown in FIGS. 14, 15, 16, 17 and 18).

The differential bridge amplifier 218 is connected by four lines 92 (e.g., power, ground +signal, −signal) to the sensor 82 via connector 219. The +signal and −signal have a range of values from 0 to 5 volts and together represent a measured pressure of the gas tank 16. For example, at 1000 psi, +signal may read 3.0 volts and −signal may read 2.0 volts. The bridge amplifier 218 determines the difference in the value between the +signal and the −signal. In this example, the determined value would be 1.0 volt, which would correspond to a measured pressure of 1000 psi. The 1.0 volt signal would be provided to the A/D converter 214 as a pressure value to be transmitted to the main controller board 128 via the connector 221 via the signal line 94.

The flexible, pressure indicator light tube 20 (shown in FIG. 2) may be manufactured in an embodiment, for example, with a plurality of light emitting diodes (LEDs), where sets of LEDs may be connected to the LED driver board (shown in FIGS. 14, 15, 16) and the LED driver board communicates with the main controller board (shown in FIG. 8). Alternatively, the plurality of LED driver boards may be utilized, where each LED driver board may be connected to a group of fiber-optic fibers corresponding to a particular zone (shown in FIG. 17) and described below. In another optional embodiment, the single main pressure sensor board (shown in FIG. 19) may control lighting the LEDs or fiber optic fibers of the flexible, pressure indicator light tube 20 as described below.

Figure 14:
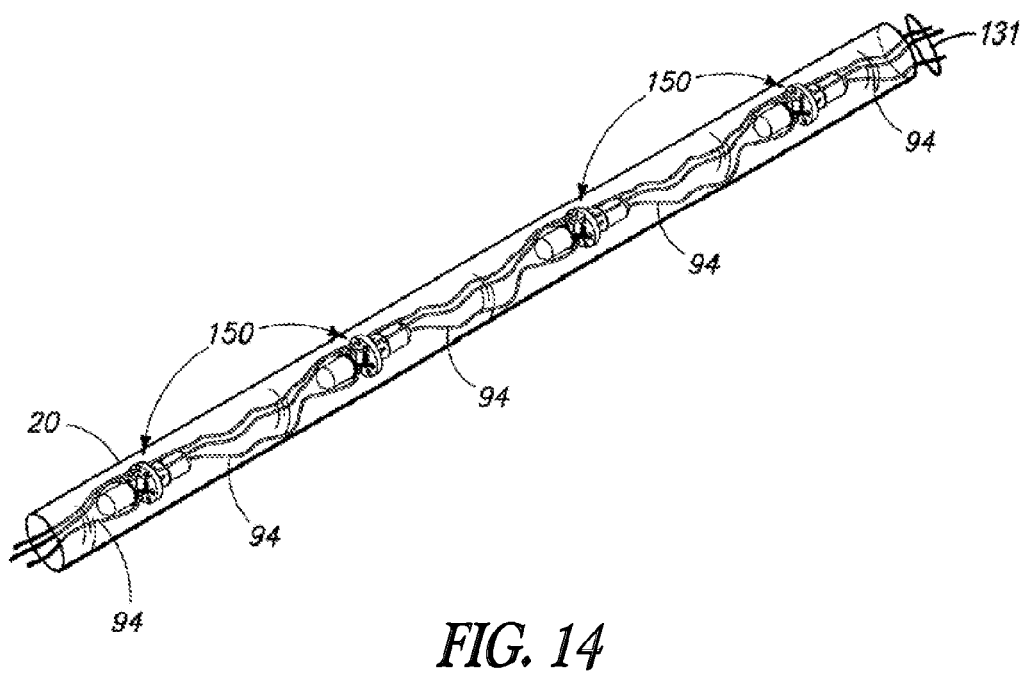
FIG. 14 illustrates a flexible, pressure indicator light tube having a plurality of LED driver boards connected to a plurality of LEDs utilized in accordance with an embodiment of the invention.
Figure 15:
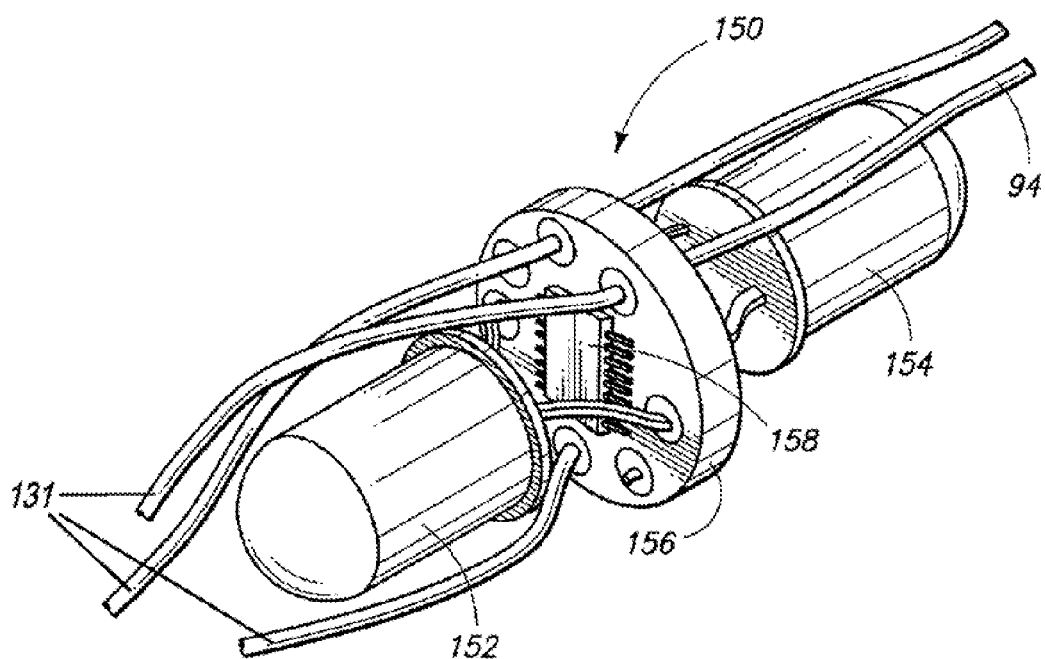
FIG. 15 illustrates a perspective view of a LED driver board having processing circuitry connected to a pair of LEDs utilized in accordance with an embodiment of the invention.
Figure 16:
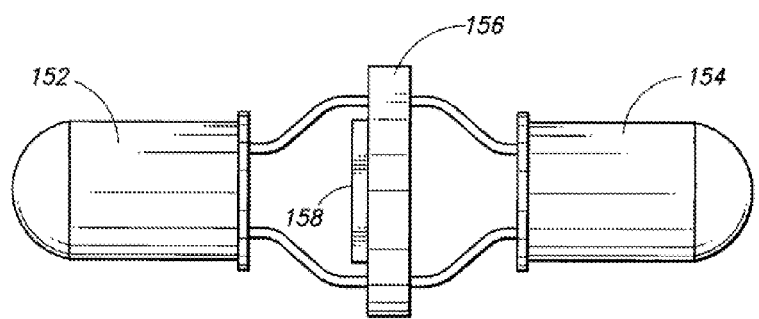
FIG. 16 illustrates a side view of a LED driver board having processing circuitry connected to a pair of LEDs utilized in accordance with an embodiment of the invention.

FIGS. 14 and 15 illustrate a flexible, pressure indicator light tube 20 having a plurality of LED driver boards 156 connected to a plurality of LEDs 150 utilized in accordance with an embodiment of the invention. More particularly, lights 150 each comprise an array of individual LEDs 152 and 154 (see FIGS. 15 and 16) provided on a LED driver board 156 (e.g., a printed circuit board) having associated operating circuitry 158 (e.g., a microcontroller and associated electronic circuitry). Optionally, the LEDs 152 and 154 may be surface mounted onto the LED driver board 156. Conductive traces 131 from the main controller board 128 (shown in FIG. 8) are provided to each LED driver board 156. The conductive traces 131 may serially connect together the individual lights 150 within the flexible, pressure indicator light tube 20. Alternatively, the conductive traces 94 may be connected in parallel to provide a parallel connection between all the lights 150 within flexible, pressure indicator light tube 20. The signal line 94 provides serial communications to the LED driver board 156. Optionally signal line 94 may be eliminated and communication may be provided over the power line thereby reducing the number of electrical connections required (e.g., from three connections to two connections).

In another alternative embodiment, the main controller board 128 may communicate with each LED driver board 156 by using radio frequency identification (RFID). The main controller board 128 may have a RFID reader (not shown) to communicate with the individual RFID tags (e.g., passive, semi-passive, and active) on the LED driver boards 156. The RFID tag may be used to identify the particular LED 152, 154 that may be illuminated and may also be used to receive a signal from the main controller board 128 as well as to transmit any error condition back to the main controller board 128. Chipless RFID (e.g. RFID tags that do not require an integrated circuit) may be utilized to minimize cost and avoid the need to hardwire the RFID tag to the circuit board 156.

In an embodiment, flexible, pressure indicator light tube 20 terminates in a sealing engagement at each end via sensor housing 22 and battery housing 24 (see FIG. 2) with a conical compression clamp. In one case, a conical compression collar seals the ends of flexible, pressure indicator light tube 20 to housings 22 and 24. Additionally, a clear, flexible and resilient material (e.g., silicon) is inserted within flexible, pressure indicator light tube 20 prior to final assembly, such as a silicon material which is cured (e.g., by using heat, ultra-violet light and the like) after insertion into flexible, pressure indicator light tube 20. The configuration of individual LEDs 152 and 154 are shown in relation to the LED driver board 156 (shown in FIG. 18) that has operating circuitry 158 (e.g., a local microcontroller).

Figure 17:
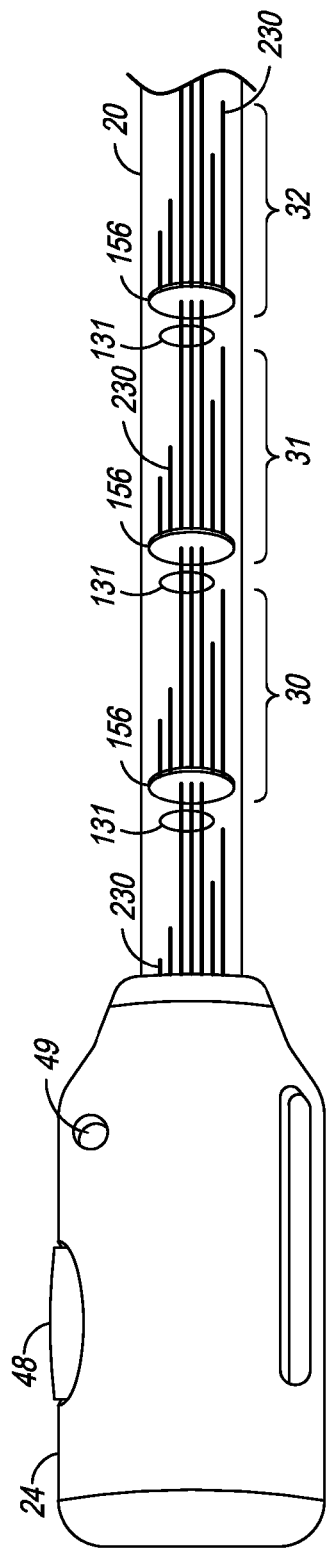
FIG. 17 illustrates a visual broadcast apparatus using fiber optics in a plurality of zones to transmit the light utilized in accordance with an embodiment of the invention.

FIG. 17 illustrates a visual broadcast apparatus 10 using fiber optics 230 fibers (e.g., glass fibers, plastic fibers, and the like) in a plurality of zones 30-32 to transmit the light formed in accordance with an embodiment of the invention. The fiber optic fibers 230 are configured in zones 30-32, as described above in relation to FIG. 2. Within each zone 30-32, the fiber optic fibers 230 are illuminated a different color, such as green, yellow, or red. The length of the optical fibers may vary depending on the length of each zone 30-32. For example, the green zone may be ten inches of optical fiber, the yellow zone may be ten to twelve inches of optical fiber and the red zone may be ten to fourteen inches of optical fiber. As shown the zones 30-32 may be of different lengths and more than three zones may be utilized. In an embodiment, each fiber in a particular zone having a single color (e.g., green) may be connected to an individual laser diode or LED in order to illuminate the fiber optic fiber 230. Optionally, an individual laser diode or LED may be utilized to illuminate a zone of fibers 230. The laser diodes or LED may have an optical output between approximately 850 nm to 1550 nm that are attenuated into the visible spectrum. Each individual fiber optic fiber 230 may be terminated in a beveled angle cut at approximately forty-five degrees. The optical fiber 230 may be terminated to increase the back reflection of the light traveling down the fiber optic path in order to generate greater illumination. In addition, in another embodiment, the optical fibers 230 may be doped with a rare-earth element to increase the gain provided by the laser diode. In such a configuration, the optical fibers may be stimulated by more than one wavelength of light to stimulate emission.

In addition, because fiber optic fiber 230 is susceptible to breakage caused by repeatedly bending the fiber 230, the flexible, pressure indicator light tube 20 may be filled with a hardening material and measured to have a durometer value (e.g., 0-40 OO) in order to control the bend radius of the fiber. Alternatively, a bendable optical fiber that may be bent with a radius as low as approximately 7.5 mm may be utilized.

An advantage of using fiber optic fibers 230 over LEDs 152, 153 may be that the visual broadcast apparatus 10 may be easier to manufacture and cheaper in cost. Further, fiber optics 230 are light weight, are not electrical in nature (e.g., not susceptible to sparks or fires), and relatively small in diameter.

Figure 18:
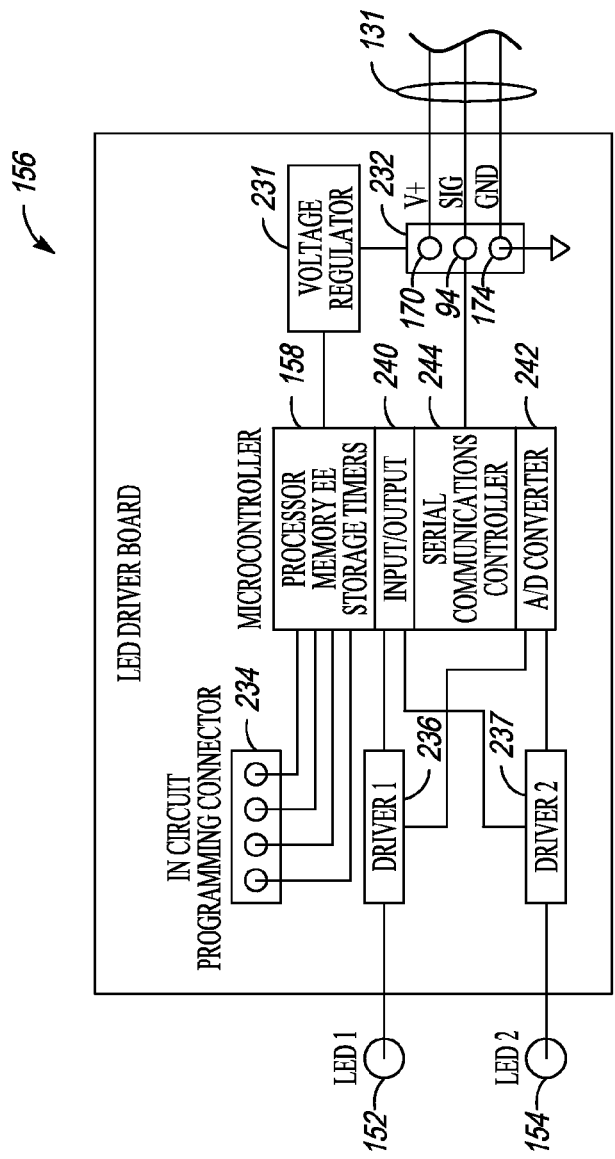
FIG. 18 illustrates a LED driver board used by the visual broadcast apparatus of FIG. 2 utilized in accordance with an embodiment of the invention.

FIG. 18 illustrates a block diagram of a LED driver board 156 utilized in accordance with an embodiment of the invention. The LED driver board 156 may control the illumination of the individual LEDs 152, 154. Alternatively, the LED driver board 156 may control the illumination of a plurality of optical fibers 230, as shown in FIG. 17. Optionally, the LED driver board 156 may have RFID tags that control the illumination of the lights 150 when commanded by the main controller board 128 (shown in FIG. 8) having a RFID reader.

The LED driver board 156 has a microcontroller 158, a voltage regulator 231, drivers 236 and 237, and connectors 232 and 234. In addition, as previously discussed the power (e.g., V+), ground (e.g., GND) and signal (e.g., SIG) lines 131 are connected to the main controller board 128 as well as individual LED driver boards 156. On the LED driver board 156, the microcontroller 158 is similar to microcontroller 138 (shown in FIG. 8) and functions as described above. Similarly, voltage regulator 231 steps down or steps up the voltage from the power source 170 (e.g., V+ having a +5 volt supply) to a voltage level required by the microcontroller 158 (e.g., +3.0 to +3.3 volts). Also, connectors 232 and 234 are similar to connectors 161 and 148 (shown in FIG. 8) as described above. Drivers 236 and 237 are directly connected to LEDs 152 and 154. In an alternative embodiment, drivers 236-237 may be eliminated for the microcontroller 158 may directly drive the LEDs 152 and 154.

The microcontroller 158 includes an analog-to-digital (A/D) converter 242 and input/output pins 240, which are connected to the drivers 236 and 237. The A/D converter 242 monitors a node on the drivers (e.g., when the drivers are resistors) to verify that a voltage is present which indicates that the LEDs 152 or 154 have not failed. A communications signal to illuminate LEDs 152, 154 may be transmitted down the signal line 94 through the serial communications controller 244 of the microcontroller 158. The microcontroller 158 then commands the input/output pins 240 to transmit a signal to the drivers 236 and 237 to turn on/off the LEDs 152, 154.

Figure 19:
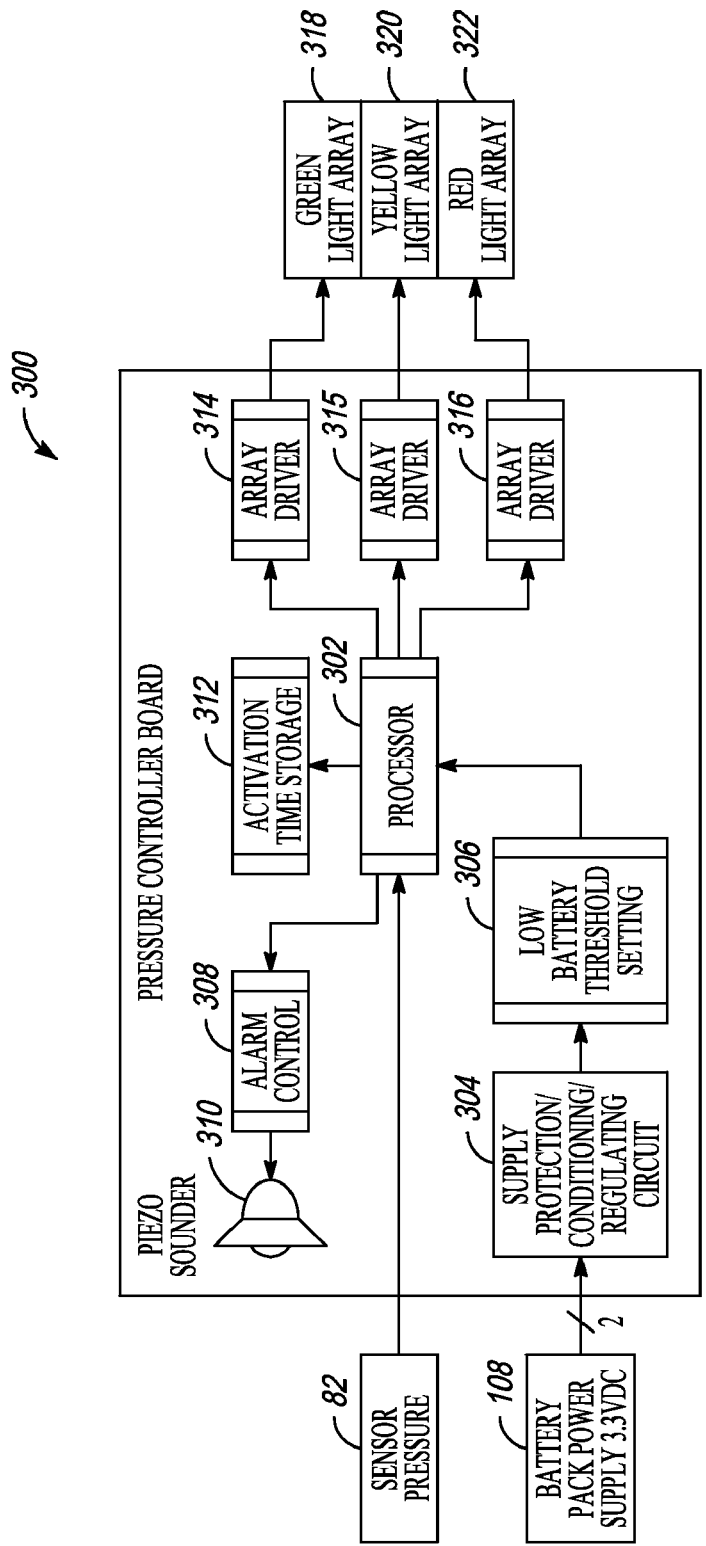
FIG. 19 illustrates an alternative embodiment of a block diagram for a pressure control board for the visual broadcast device of FIG. 2 presented in accordance with an embodiment of the present invention.

As mentioned above, a single main pressure sensor controller board 300 (shown in FIG. 19) may be utilized to control lighting the LEDs 152, 153, the fiber optic fibers 230 or a flex circuit (shown in FIGS. 21 and 22) of the flexible, pressure indicator light tube 20 as described below. FIG. 19 illustrates an alternative embodiment of a block diagram for a pressure controller board 300 for the visual broadcast device 10 of FIG. 2 presented in accordance with an embodiment of the present invention. The pressure controller board 300 measures a gas pressure from the tank 16, monitors a voltage level of the batteries 108, and controls the illumination of the lights.

The pressure controller board 300 includes a processor 302, a supply/conditioning regulating circuit 304, a low battery threshold setting 306, alarm control 308, a speaker 310, a time activation storage 312, and array drivers 314-316. Electrical power is supplied to the pressure controller board 300 via a battery pack 108. In an embodiment, at least two battery packs 108 are used, with each battery pack 108 providing approximately 3.3 volts. The battery pack 108 maybe connected to the supply protection/conditioning regulating circuit 304 that holds the voltage at a constant voltage level (e.g., 3.3 volts). The regulating circuit 304 provides the voltage to the low battery threshold 306, which compares the voltage level to a predetermined threshold voltage (e.g., 2.0 volts). If the measured voltage level is below the threshold voltage, a low voltage signal may be transmitted to the processor 302 indicating battery pack 108 may need to be either recharged or replaced. The processor 302 may send a signal to array driver 315 to either illuminate the yellow light array 320 as a solid yellow color or flash the yellow light array 320 to indicate a low battery voltage condition.

The processor 302 accepts a signal from the pressure sensor 82 that indicates the pressure of the gas tank 16, which corresponds to the amount of remaining gas/air in the tank 16. The processor 302 may activate the alarm control 308, which in turn may turn on a piezo sounder 310, based on the value from the pressure sensor 82. If the alarm control 308 is activated, the processor 302 may also command the array drivers 314, 315 and 316 to illuminate the light arrays 318, 320, and 322 according to a predetermined pattern (e.g., flashing colored lights, solid colored lights, alternatively turning on and off the green array, yellow array and red array of lights, and the like). In addition, if the value from the pressure sensor 82 is less than a predetermined value. Alternatively, the processor 302 may not activate the alarm control 308 in order to illuminate the light array 318, 320 and 322.

Figure 20:
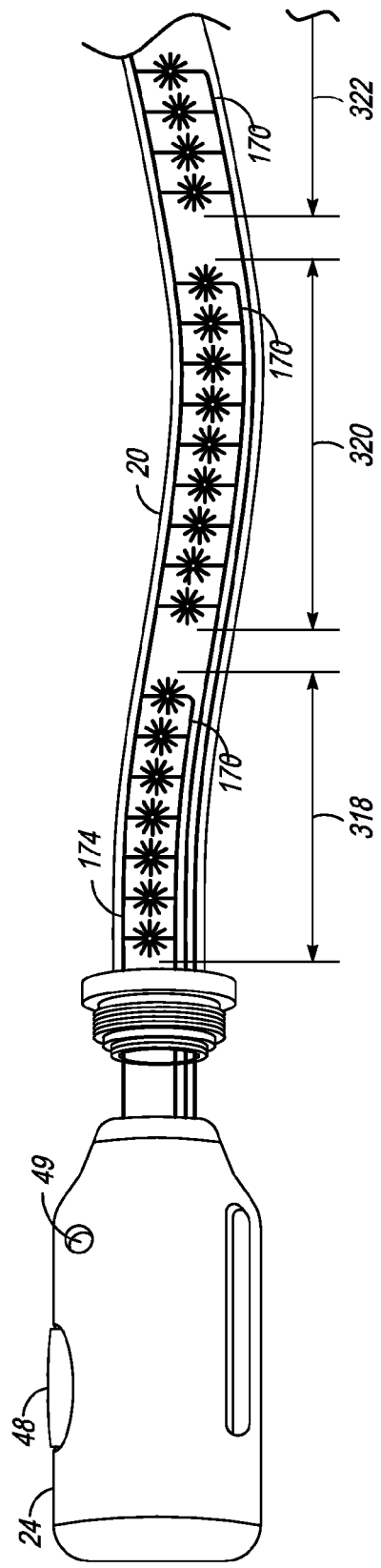
FIG. 20 illustrates a visual broadcast apparatus using arrays of light emitting diodes (LEDs) utilized in accordance with an embodiment of the invention.

For example, processor 302 may receive a value of the gas pressure from the pressure sensor 82 and store the value in storage 312. In addition, processor 302 may test the value of the pressure value against predetermined levels to determine which light array is to be illuminated, as discussed in FIGS. 6A and 6B above. In one embodiment, the light arrays may be arrays of LEDs as shown in FIG. 20, which are illuminated as described above. Alternatively, the light arrays may be arrays of optical fiber as shown in FIG. 21, which are illuminated as described above. Optionally, the light array may be encapsulated onto a flex circuit as shown in FIGS. 22 and 23, and discussed below.

FIG. 22 illustrates a flex circuit board having a plurality of light emitting diodes (LEDs) formed in accordance with an embodiment of the invention. FIG. 23 illustrates the flex circuit board of FIG. 22 being inserted into a flexible light tube formed in accordance with an embodiment of the invention. The flexible circuit board 1050 of FIG. 22 has a plurality of LEDs 1152-1154, a plurality of bend reliefs 1157, 1159, 1094, and 1019 and connectors 1017, 1018. The bend reliefs 1157, 1159, 1094, and 1019 provide the flexible, pressure indicator light tube 20 flexibility when the flexible, pressure indicator light tube 20 bends in various directions. For instance the bend reliefs 1157, 1159, 1094, and 1019 may lengthen and/or shorten an area 1160 of the flex circuit 1050. Also, the bend reliefs 1157, 1159, 1094, and 1019 may be approximately ¼ inch in length (e.g., see area 1160) to allow for any changes of length to the flex circuit as the flex circuit is rolled to be placed within the flexible, pressure indicator light tube 20, as well as when the flexible, pressure indicator light tube 20 moves in a medium such as water or air. LEDs 1152-1154 are surface mount LEDs are configured to be positioned in a circle, where each LED 1152-1154 is placed 120 degrees from the next LED. Surface mount LEDs are utilized in order to provide a space savings and the ability to incorporate the flexible circuit board 1050 into the transparent housing 1020 of the flexible, pressure indicator light tube 20, which may, for example, have a diameter of 0.5 inches. The flexible circuit board is rolled such that the LEDs 1152-1154 are positioned outward to emit light outside the transparent housing 1020 of the flexible, pressure indicator light tube 20 when the LEDs 1152-1154 are illuminated. The connector 1017 may be connected to the pressure unit 22 and the connector 1018 may be connected to the battery unit 24.

Figure 24:
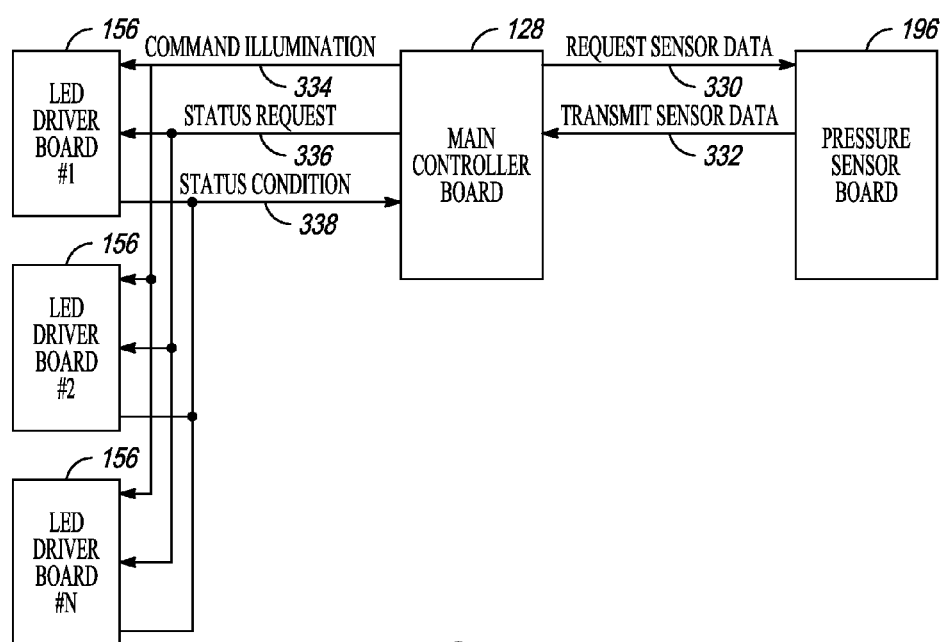
FIG. 24 illustrates a communication protocol for the breathing gas supply visual broadcast apparatus of FIG. 2 utilized in accordance with an embodiment of the invention.

FIG. 24 illustrates a communication protocol for the breathing gas supply visual broadcast apparatus 10 of FIG. 2 utilized in accordance with an embodiment of the invention. The main controller board 128 (shown in FIG. 8) communicates with the pressure sensor board 196 (shown in FIG. 13) and a plurality of LED driver boards 156 (shown in FIG. 18) to receive a measured pressure, determine the amount of air/gas remaining in a tank 16, and illuminate a plurality of lights in a particular predetermined zone based on the measured pressure. During operation of the visual broadcast apparatus 10, the pressure sensor board 196 may constantly measure the pressure of a gas tank 16. Alternatively, the pressure sensor board 196 may obtain the pressure when requested by the main controller board 128. The main controller board 128 transmits a request 330 to the pressure sensor board 196, which responds by transmitting pressure data 332. Based on the pressure data, the main controller board 128 transmits a command signal 334 to at least one LED driver board 156 to illuminate a plurality of lights (e.g., LEDs, optical fibers, and the like). In an embodiment, a plurality of LED driver boards 156 may be commanded to illuminate at least one light in at least one zone 28-32. Furthermore, the main controller board 128 may verify the operation of the lights by transmitting a status request 336 to a specific LED driver board 156. In turn, the LED driver board may verify the operation of itself, as well as the operation of any connected lights (e.g., LEDs, optical fibers, and the like), and receive a status condition 338 indicating whether the lights are correctly functioning.

Figure 25A:
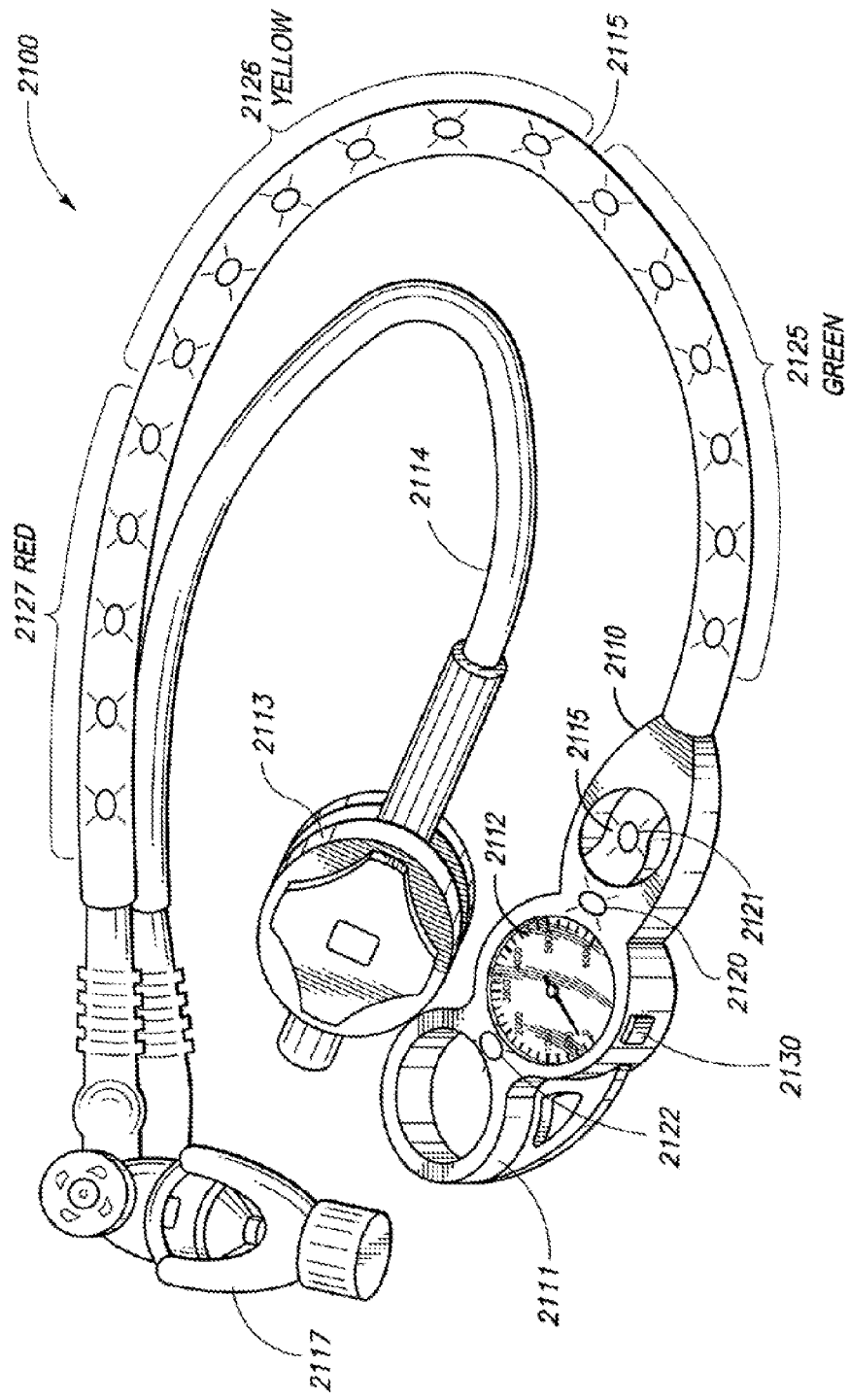
FIGS. 25A and 25B illustrate an air supply device having an air supply warning system utilized according to an embodiment of the invention.
Figure 25B:
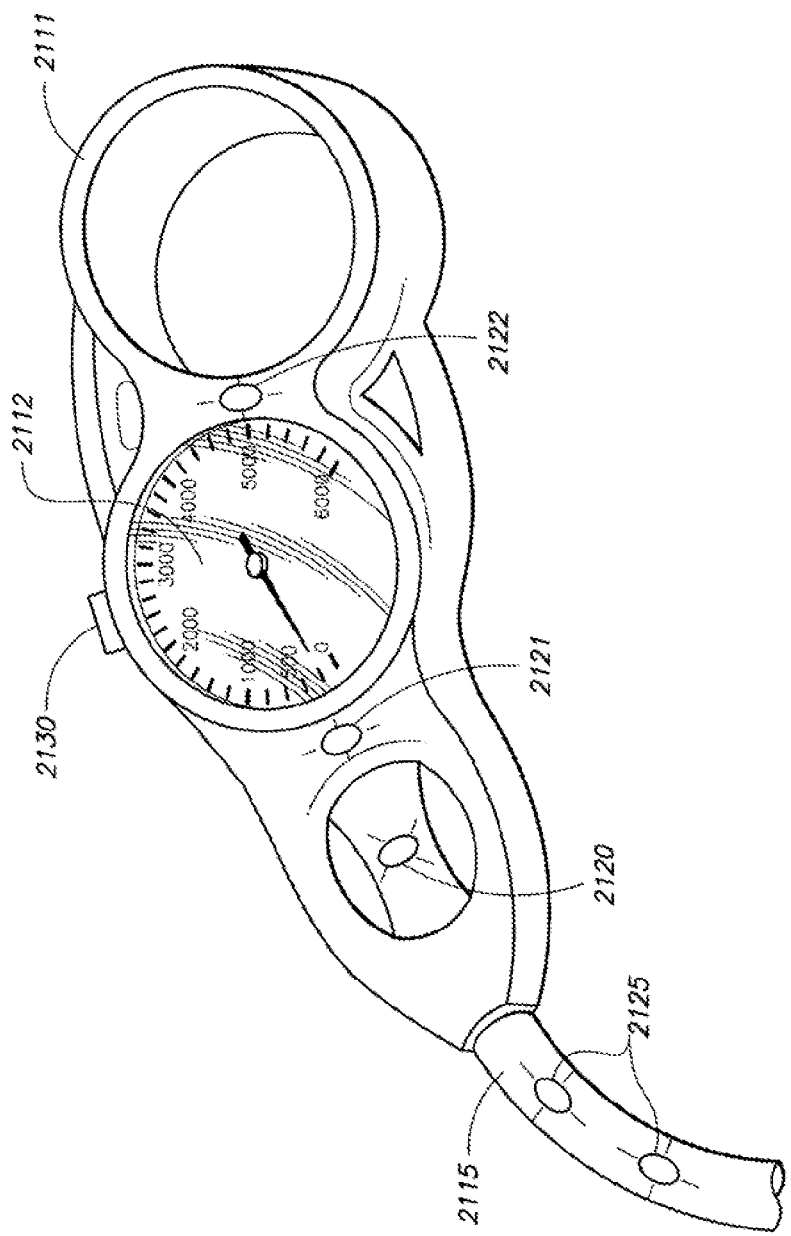

FIGS. 25A and 25B illustrate an air supply device having an air supply warning system according to an embodiment of the invention. The air supply device 2100 includes a console 2111 a mouth piece 2113, air supply hoses 2114 and 2115, and a pressure regulator 2117. The console 2111 (shown in FIG. 25B as an enlarged view) includes a housing 2110, which may be constructed from rubber, and may be modular to accept various devices, such as a mechanical pressure gauge 2112, a button 2130, an auditory transducer (not shown), a battery, a compass, a depth gauge, a clock, a dive computer, and the like. The console 2111 may also include a plurality of LEDs 2122 (e.g., colored red), and 2120 (e.g., colored yellow) and a hose 2115 having an LED 2121 (e.g., colored green). The button 2130 may be configured as a switch to select various modes, as described above. A mechanical pressure gauge 2112 is illustrated, but an electronic pressure gauge or dive computer with a digital display may also be used. The air hose 2115 includes three zones of LEDs 2125, 2126 and 2127, and incorporates a flex circuit (shown in FIGS. 22 and 23) that includes a cylindrical channel (not shown) in which air may be conducted to the pressure gauge 2112. It should be appreciated that the console 2111 may contain the electrical circuit for energizing the LEDs

2120-2122 and 2125-2127. In this instance, the pressure gauge 2112 would make electrical contact with the electrical circuit when installed to allow the circuit to receive signals corresponding to the pressure in the tank from the gauge and energize the LEDs. For example, the pressure gauge 2112 functions as a pressure sensor of the compressed air in the tank (not shown) to illuminate the LEDs 2120-2121 where the detected pressure also may illuminate different zones 2127, 2126, 2125 of LEDs.

The pressure gauge 2112 includes an electrical circuit (not shown) that is electrically connected to the LEDs 2120-2122 and 2125-2127 to energize the LEDs 2120-2122 and 2125-2127 according to the pressure detected by the gauge 2112. For example, when the air tank is full (e.g., 5000 psi) the green LED 2121 lights up the console 2111 and all of the LEDs 2125-2127 light up the air hose 2115. When the gauge 2112 detects an intermediate pressure level (e.g. 1000 psi) in the tank, the yellow LED 2120 illuminates on the console 2111, the green LED 2121 turns off, the green LED zone 2125 turns off, and the LEDs in the yellow zone 2126 illuminate the air hose 2115. In addition, a beeping sound may be emitted by a speaker located within the gauge 2112 or console 2111 to provide an audible signal to the diver that the air tank is getting low on air or a breathable gas. The LEDs 2120 and 2122 and 2126-2127 may also flash a pattern when illuminated. The audible signal may stop sounding and the flashing LEDs may stop flashing when button 2130 is depressed. When the air pressure detected by the pressure gauge 2112 reaches a low pressure level (e.g., 500 psi), the red LED 2122 may illuminate on the console 2111, the LED 2120 turns off, the LEDs in zone 2126 turn off, and the LEDs in zone 2127 may illuminate the hose 2115. A pressure of less than a threshold value (e.g., a pressure less than 500 psi) may cause the gauge 2112 or console 2111 to emit an audible sound and cause the LED 2122 and the LEDs in zone 2127 to flash a red color. At this point, the device 2100 may be programmed so that the audible signal and flashing LED 2122 as well as flashing LEDs in the zone 2127 cannot be turned off by depressing the button 2130.

As described above the air hose 2115 may be sectioned into three separate LED sets/zones that operate independently from one another. When scuba diving in deep water, the colors of the LEDs 2120-2122 and 2125-2127 may become indistinguishable. Thus, simply changing the color of the console 2111 and hose 2115 would not provide a suitable visual indication of air pressure in the tank. By turning off sections of the LEDs 2125-2127, the hose 2115 acts like a "gas gauge" or bar graph. When all three LED sections 2125-2127 are illuminated, the scuba divers know that they have adequate air in the tank. When only two zones 2126-2127 are illuminated, the individual knows that the air in the tank is getting low on air/gas and that he/she should begin to ascend to the surface of the water. When the LED zone 2127 is illuminated, the diver knows that he/she may be in danger of running out of air and needs to ascend to the surface of the water immediately. The illumination zones are arranged such that the lights which are illuminated reflect the pressure condition in the tank. For example, as the gas pressure in the tank gets lower the lights closer to the diver's head illuminate (e.g., green lights farthest away, yellow lights in the middle, and red lights closest to the tank regulator and the diver's head). This arrangement of the lights allows divers to realize the air pressure in the tank without having to know the colors (e.g., a colorblind person would be able to tell if the tank was low on air; also as known to deep sea divers, the deeper a diver dives results in color being absorbed by the water). Thus, other divers, even if not next to the scuba diver, and at a distance may view the illuminated lights and immediately know the air supply of the diver as well as others in a group, which allows guides, instructors, or other diving companions to motion/instruct the diver having a low air supply to ascend to the surface of the water.

In addition, device 2100 may be used in any suitable air supply system, for example, fire fighter air supplies as used with a self-contained breathing apparatus (SCBA) along with a personal alert safety system (PASS).

FIG. 25B shows a "two-hole" console 2111. The console 2111 and air hose 2115 may be made of a transparent or translucent material, such as plastic or rubber, and may incorporate the light emitting diodes (LEDs) 2120, 2121, 2122, 2125 or other suitable light sources to provide a visual indication of the pressure of the air tank. It should also be appreciated that the LEDs 2120-2122 of FIG. 25B may also operate in the same manner as the LED sets 2125-2127 of FIG. 25A. Thus, when the tank is full all three LEDs 2120-2122 will be energized.

Figure 26:
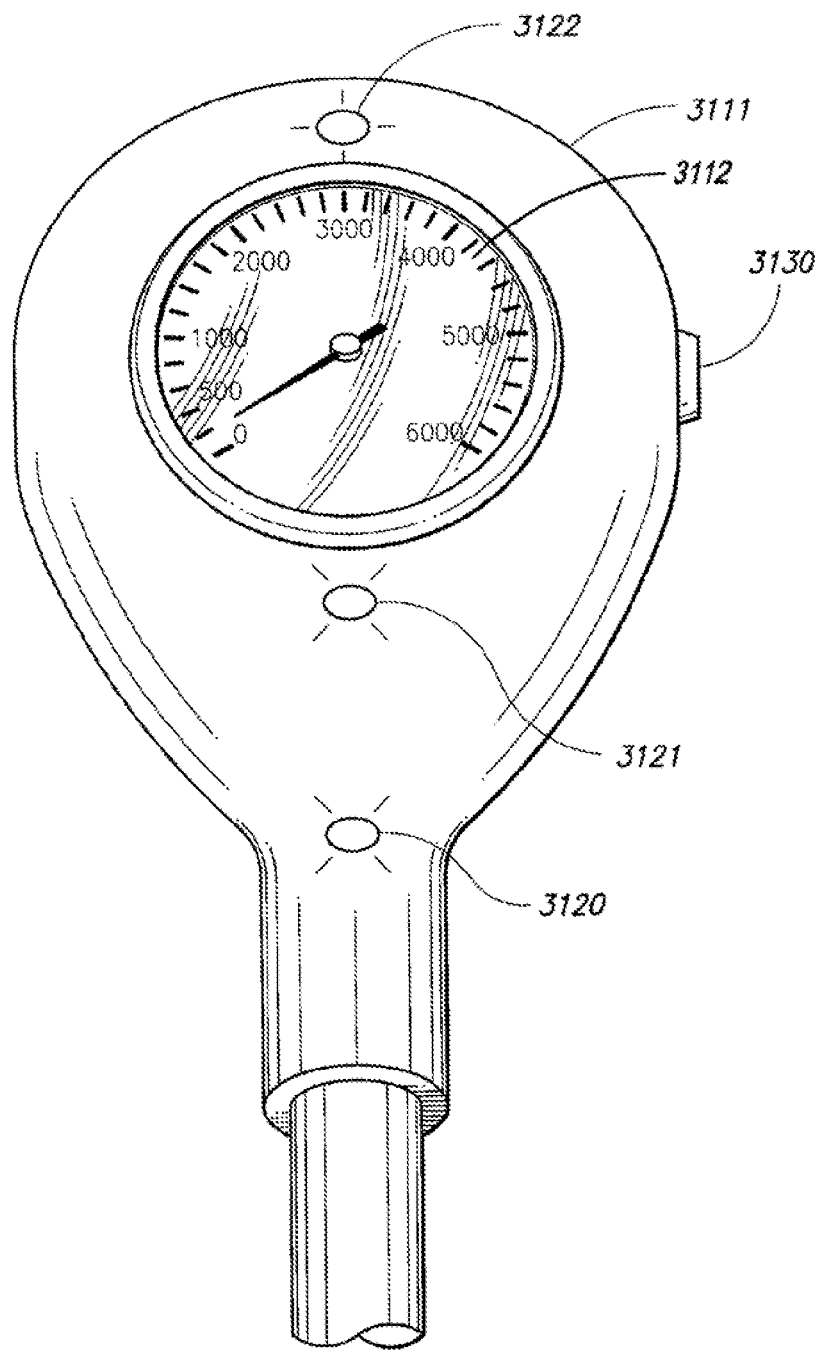
FIG. 26 illustrates a single gauge console having a plurality of light emitting diodes (LEDs), a gauge and a button utilized in accordance with an embodiment of the invention.

FIG. 26 shows a single gauge console 3111 that includes LEDs 3120, 3121, and 3122, a gauge 3112, and a button 3130. Any other suitable design for holding a pressure gauge may be used. The console 3111 may include a red LED 3120, a yellow LED 3121, and a green LED 3122. The LEDs 3120, 3121, and 3122 are illuminated based upon a measured air pressure from the tank.

Figure 27:
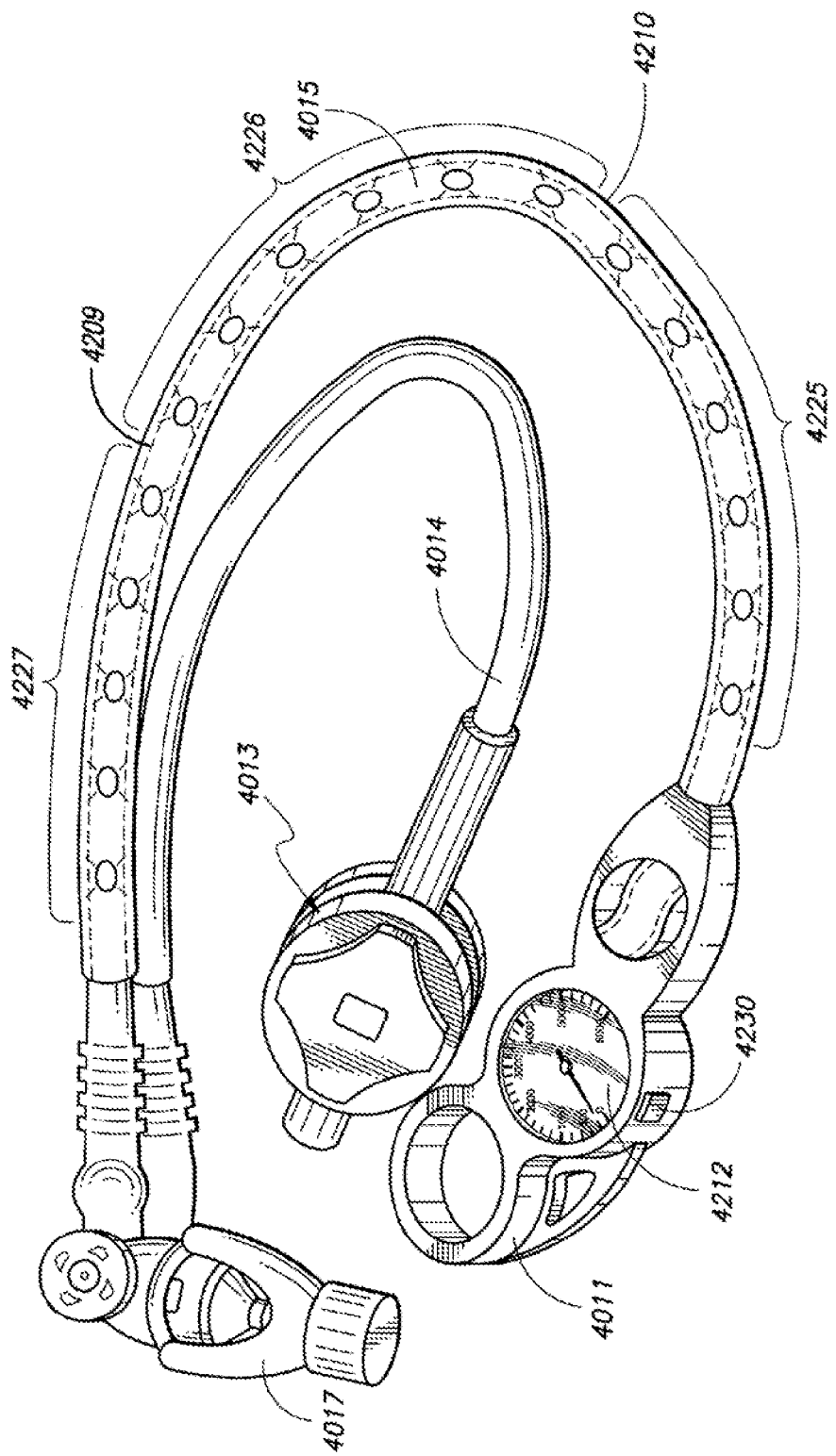
FIGS. 27 and 28 illustrate an air supply warning system in the form of a hose cover and pressure gauge utilized in accordance with an embodiment of the invention.
Figure 28:
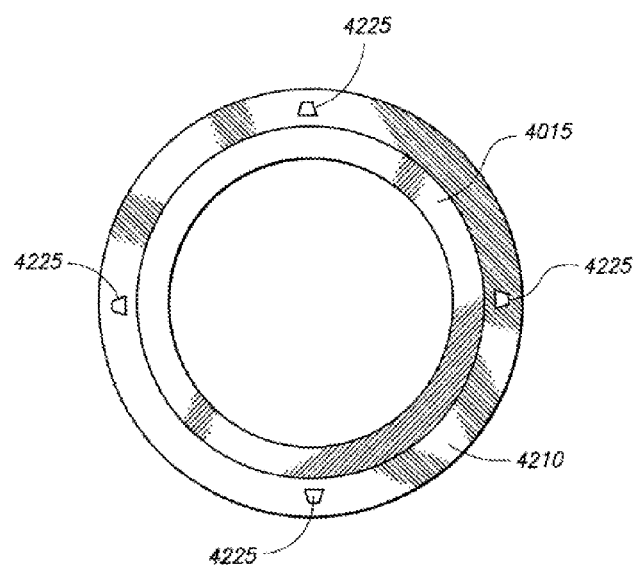

Referring to FIGS. 27 and 28, an air supply warning system according to another embodiment of the invention in the form of a hose cover 4210 and pressure gauge 4212 is illustrated. The air supply device includes a console 4011, a mouth piece 4013, air supply hoses 4014, and a pressure regulator 4017. The console 4011 can include a pressure gauge 4212 and a button 4230. The hose cover 4210 fits over a hose 4015. The hose cover 4210 can include an inner wall 4209. The hose cover 4210 includes three sets of LEDs 4225-4227. The sleeve has a plurality of LEDs 4225 on the outside periphery as shown in FIG. 28 that may be configured as a flex circuit (shown in FIGS. 22 and 23). The hose cover 4210 and gauge 4212 are designed to be used with existing commercially available air supply devices, such as a traditional two-stage scuba regulator and tank. The hose cover 4210 is an outer jacket that may enclose a pressure hose 4015.

FIG. 29 illustrates a broadcast device 2010 wherein a snorkel is provided having a double wall, with a clear outer wall 2020 terminating in a mouthpiece 2011 in accordance with an embodiment of the invention. Device 2010 includes an array of lights, such as the previously discussed LEDs distributed between the walls of device 2010, and viewable through a clear outer tube 2020. Additionally, a battery pack 900 and a sonic receiver 902 are configured to receive control signals from a transducer 6000 that determines the specific lights that may be illuminated in each specific illuminated zone of device 2010 depending on the pressure condition of an air tank.

FIG. 30 illustrates a visual broadcast device 3010 in accordance with an embodiment of the invention. The visual broadcast device 3010 may be provided in the form of a clear and flexible double walled sleeve 3020 including an array of lights 3021, such as LED lights, distributed between the inner and outer walls. Tubular sleeve 3020 is sized to be received over a high pressure hose on a scuba tank pressure gauge which mates to a high pressure port provided on a distal end 3023 of pressure sensor 3022 within tube 3020. Pressure sensor 3022 is subsequently mated to a high pressure port on a first stage of a scuba regulator to detect pressure within an accompanying scuba tank.

FIG. 31 illustrates a visual broadcast device 4010 including a flexible and light transmissive tube 4020 having LED lights distributed therein in accordance with an embodiment of the invention. Tube 4020 is mounted onto a battery holder and receiver housing 4024 that includes an LED driver and may be configured to receive control signals from a sonic transmitter 4026 (e.g., may also be an acoustic transducer). Housing 4024 also includes batteries for supplying power to the lights within tube 4020 and for powering a sonic receiver within the receiver housing 4024. Sonic transmitter 4026 is configured to be mounted onto a first stage high pressure port of a scuba regulator and is operative to detect pressure conditions and send control signals to sonic receiver 4024 to direct the illumination of individual lights within tube 4020 in specified illumination zones.

FIG. 32 illustrates another embodiment of a visual broadcast device 5010. Device 5010 includes a flexible and light transmissive tube 5020 having a plurality of lights, such as LEDs contained therein operative to be illuminated in specific illumination zones in patterns as previously discussed in the other embodiments. Tube 5020 communicates with a sensor housing 5022 that couples with a first stage of a scuba regulator and a battery housing 5024. Battery housing 5024 is provided with positive buoyancy so as to serve as a float that vertically elevates tube 5020 when attached to a scuba tank regulator. Such a configuration enhances visibility of the lights within tube 5020 in all directions to accompany divers in a dive party.

FIG. 33 illustrates a visual broadcast device 6010 including a flexible light transmissive tube 6020 provided between a sensor housing 6022 and a battery housing 6024 in accordance with an embodiment of the invention. However, battery housing 6024 includes a tactile switch 6025 that enables a user to turn on a specific light source 6027 that is exceptionally bright adjacent to sensor 6022. Accordingly to one implementation, the exceptionally bright light 6027 comprises a super bright LED. The super bright LED may be configured to flash in an "SOS" pattern responsive to the switch 6025 on battery housing 6024 being activated by user. Further, the super bright LED 6027 may be used at night for identification of the location of a diver for a search and rescue. For example, a diver may also use switch 6025 to turn on the super bright LED 6027 if a low battery condition is detected in order to save battery power. A diver may also turn on the super bright LED 6027 when diving in very dark environments (e.g., cave), in very low visibility conditions (e.g., murky water) in order for others to identify his/her location. Switch 6025 may be configured to control the brightness of the LEDs 6011. Switch 6025 may be configured to turn on and off accessories, such as emergency positioning indicating radio beacon (EPIRB), laser pointers (as shown in FIG. 34), as well as to run a self-test, monitor the battery.

FIG. 34 illustrates a visual broadcast device 7010 in accordance with an embodiment of the invention. More particularly, device 7010 includes a flexible, light transmissive tube 7020 provided between a sensor housing 7022 and a battery housing 7024. However, battery housing 7024 includes a laser pointer 7026 that can be activated by a user to point at items underwater and to be used as a long distance beacon. The color of the laser pointer may operate, for example, in a variety of wavelengths ranging from 400-700 nanometers and operate from 1-5 milliwatts in power. For instance, above the water, the long distance beacon may be used to signal a boat to identify a diver's location and have the boat collect the diver, or the beacon may be used as a signal in an emergency situation if no boat is present. Under the water, the long distance beacon may be used to signal another diver, to point to objects in the water, identify a diver's location, or signal for help. Optionally, the laser pointer 7026 features of battery housing 7024 can be automatically activated through control circuitry responsive to a detected condition on the pressurized air supply. Further optionally, a manual switch (as shown in FIG. 33) can be provided for the user to activate the laser pointer 7026 at the user's discretion.

Figure 35A:
FIGS. 35A, 35B, and 35C illustrate the visual broadcast apparatus connected to a regulator and a specific zone of the visual broadcast apparatus illuminated in accordance of an embodiment of the invention.
Figure 35B:
Figure 35C:
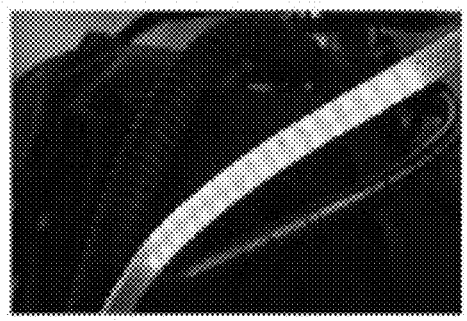

FIGS. 35A, 35B, and 35C illustrate the visual broadcast apparatus connected to a regulator and a specific zone of the visual broadcast apparatus illuminated in accordance of an embodiment of the invention. FIG. 35A depicts the visual broadcast apparatus 10 connected to a regulator 14 (as shown in FIG. 1) and tied to a buoyancy compensator (as shown in FIG. 1). FIG. 35B depicts a functioning visual broadcast apparatus 10 with lights in zone 30 illuminated to show a green color which indicates that the pressure corresponding to the amount of air remaining in the tank 16 is adequate. FIG. 35C depicts a closer view of FIG. 35B showing particular LEDs illuminated in zone 30.

Figure 36A:
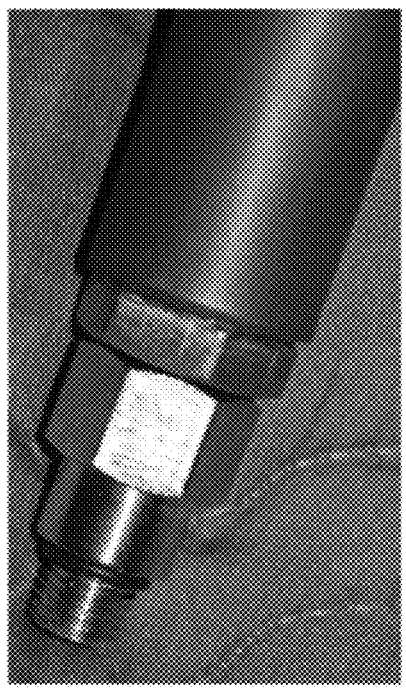
FIG. 36A illustrates a sensor unit manufactured utilized in accordance with in accordance of an embodiment of the invention.
Figure 36B:
FIG. 36B illustrates a battery unit with a strap to attach to a buoyancy compensator manufactured utilized in accordance of an embodiment of the invention.

FIG. 36A illustrates a sensor unit manufactured in accordance with in accordance of an embodiment of the invention. FIG. 36B illustrates a battery unit with a strap to attach to a buoyancy compensator manufactured in accordance of an embodiment of the invention.

Figure 37C:
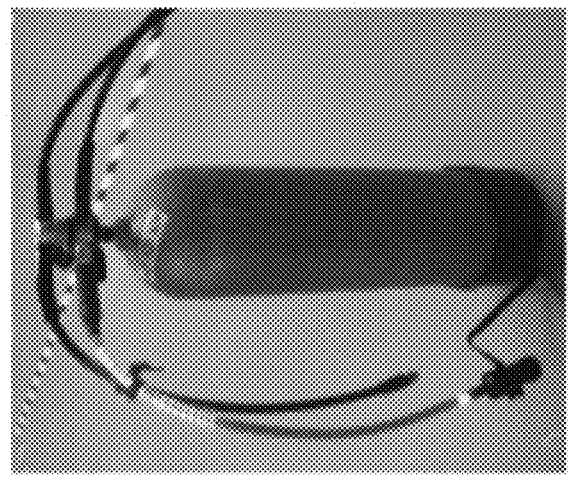
FIGS. 37A, 37B, and 37C illustrate the visual broadcast apparatus of FIG. 2 connected to a "pony" bottle utilized in accordance of an embodiment of the invention.
Figure 37B:
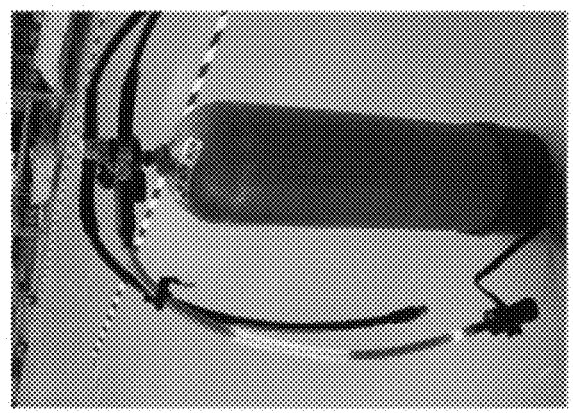
Figure 37A:
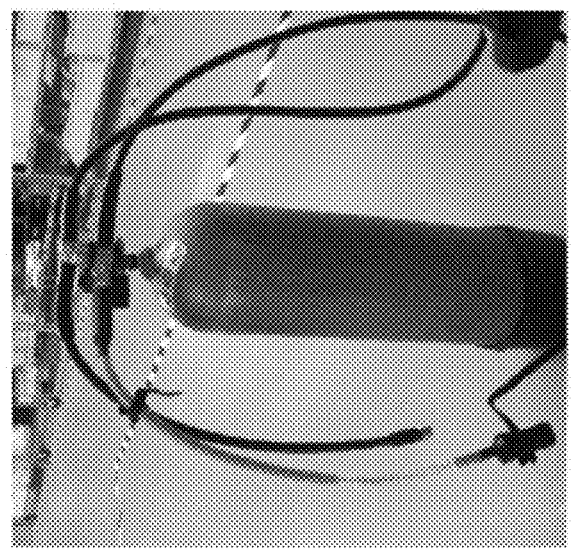
Figure 38:
FIG. 38 illustrates a visual broadcast apparatus that is broadcasting a "green zone" indicating a full tank of air and a pressure gauge verifying the level of air pressure utilized in accordance of an embodiment of the invention.

FIGS. 37A, 37B, and 37C illustrate the visual broadcast apparatus of FIG. 2 connected to a "pony" bottle utilized in accordance of an embodiment of the invention. A pony bottle is an ancillary tank of air typically utilized as a backup reserve tank of air to the main tank of air. FIG. 37A depicts the visual broadcast apparatus 10 having the lights in zone 30 (as shown in FIG. 4 and described above) illuminated a solid green color to indicate that the pony bottle is either full air or contains a safe amount of air. Related to FIG. 37A is FIG. 38 that shows a pressure gauge next to an illuminated visual broadcast apparatus 10. The pressure gauge shows a pressure of approximately 3000 psi that indicates the tank is full of air, and based on the illumination of the lights in zone 30 further verifies that the visual broadcast apparatus 10 is working correctly.

Figure 39:
FIG. 39 illustrates a visual broadcast apparatus that is broadcasting a "yellow" zone indicating an adequate amount of air in a tank and a pressure gauge verifying the level of air pressure utilized in accordance of an embodiment of the invention.
Figure 40:
FIG. 40 illustrates visual broadcast apparatus that is broadcasting a "red" zone as a pressure gauge shows the pressure decreasing from 1000 psi to a new value of 750 psi utilized in accordance of an embodiment of the invention.

FIG. 37B depicts the visual broadcast apparatus 10 having the lights in zones 31 and 29 (as shown in FIG. 4 and described above) illuminated a solid yellow color to indicate that the pony bottle contains an adequate amount of air. Related to FIG. 37B is FIG. 39 that shows a pressure gauge next to an illuminated visual broadcast apparatus 10. The pressure gauge shows a pressure of approximately 1000 psi that indicates the tank has an adequate amount of air, and based on the illumination of the lights in zone 31 as a solid yellow color further verifies that the visual broadcast apparatus 10 is working correctly. FIG. 40 shows the pressure gauge showing the pressure further dropping from 1000 psi to a new value of 750 psi and the visual broadcast apparatus 10 still illuminating the lights in zone 31 as a solid yellow color.

Figure 41:
FIG. 41 illustrates a visual broadcast apparatus that is broadcasting a "red" zone indicating a dangerous low amount of air in a tank and a pressure gauge verifying the level of air pressure utilized in accordance of an embodiment of the invention.
Figure 42:
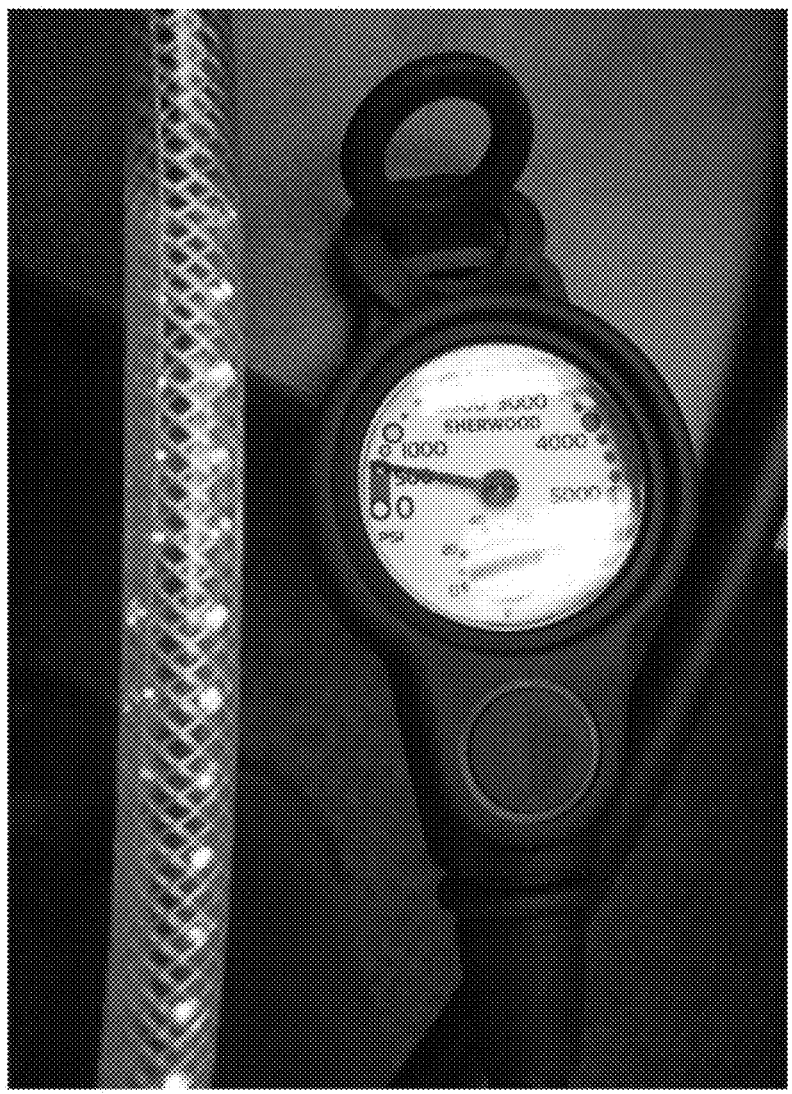
FIG. 42 illustrates an enlarged view of FIG. 41 showing the individual red colored LEDs illuminated in the tube in the "danger" zone utilized in accordance of an embodiment of the invention.

FIG. 37C depicts the visual broadcast apparatus 10 having the lights in zones 32 and 28 (as shown in FIG. 4 and described above) illuminated a solid red color to indicate that the pony bottle contains a dangerous low level of air. Related to FIG. 37B is FIG. 41 that shows a pressure gauge next to an illuminated visual broadcast apparatus 10. The pressure gauge shows a pressure of approximately 500 psi that indicates the tank has a dangerous low amount of air, and based on the illumination of the lights in zone 32 as a solid red color further verifies that the visual broadcast apparatus 10 is working correctly. FIG. 42 is an enlarged view of FIG. 41 that shows the individual red colored LEDs illuminated in the flexible, pressure indicator light tube 20 in zone 32.

Figure 44A:
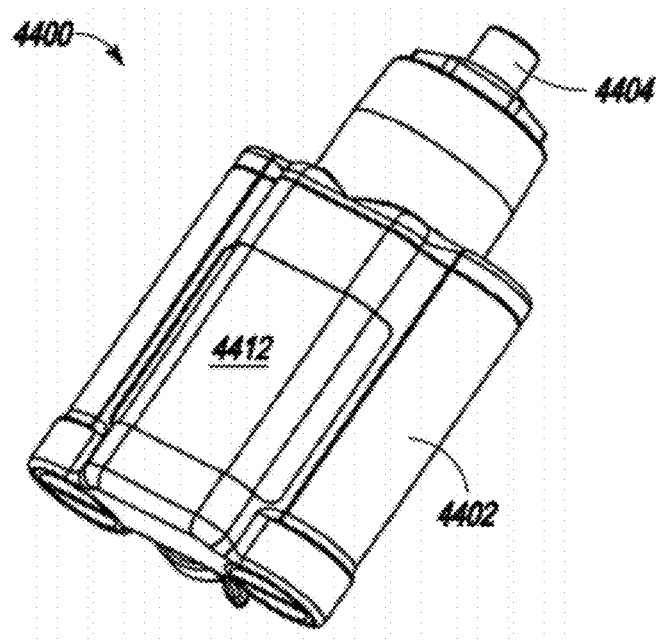
FIGS. 44A, 44B, and 44C show respective top, bottom, and exploded views of another example of a visual broadcast device 4400 formed in accordance of an embodiment of the invention.
Figure 44B:
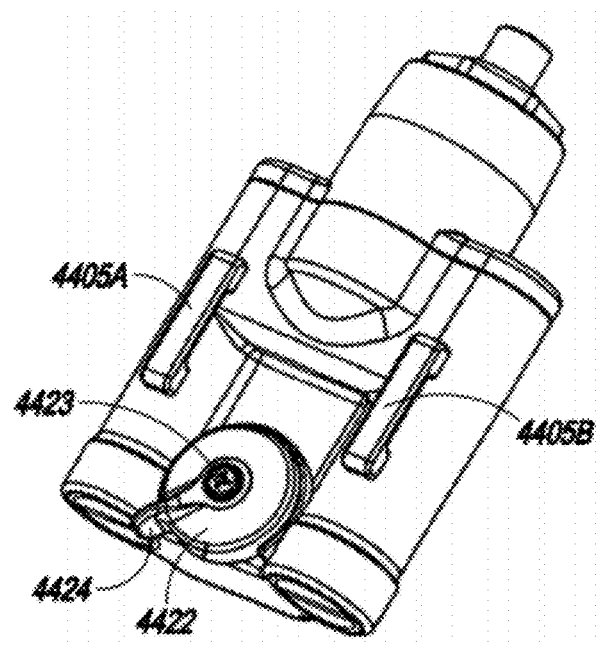
Figure 44C:
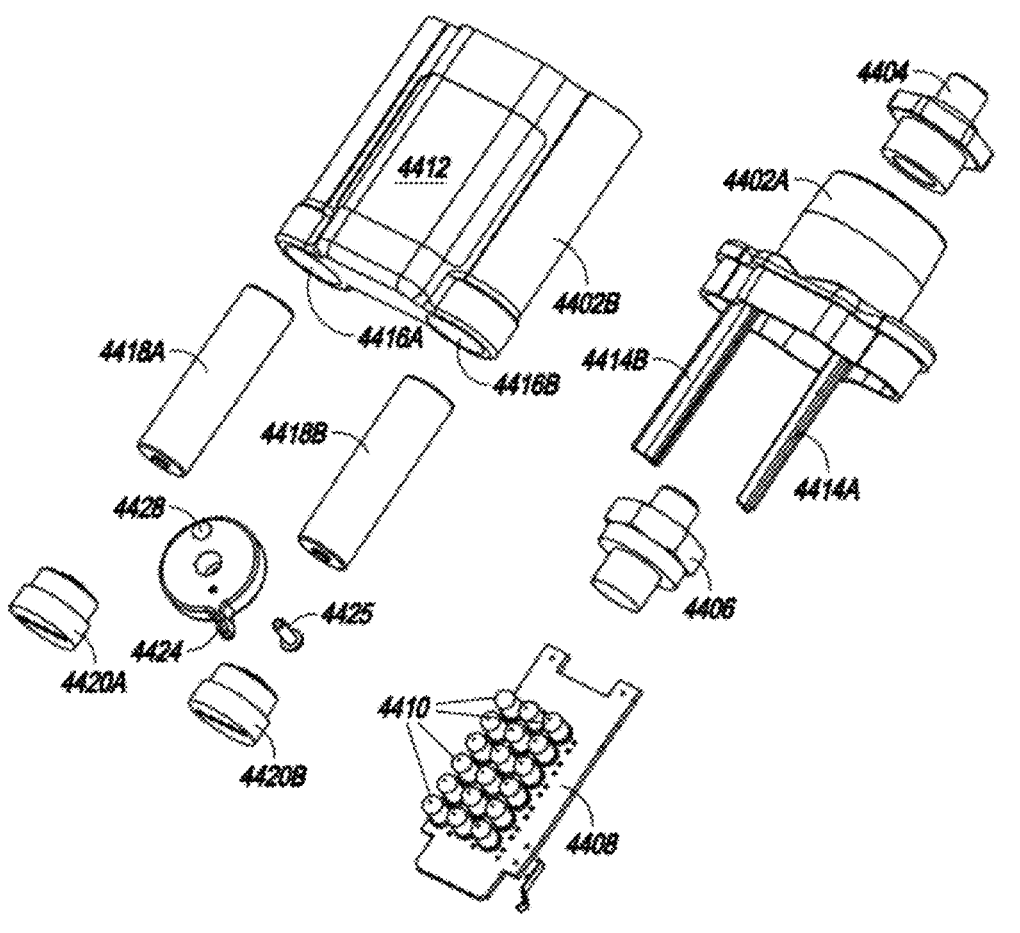

FIGS. 44A, 44B, and 44C show respective top, bottom, and exploded views of another example of the present visual broadcast device 4400. In this example, the visual broadcast device 4400 can include a watertight sealed housing 4402 (e.g., watertight up to 150 feet depth, in an illustrative example). A proximal end of the housing 4402 can include a stainless steel or other hose coupling 4404. The hose coupling 4404 can be connected to a high pressure port of the regulator 14. This connection can be made using a length of hose extending therebetween. The length of the hose can be such that the visual broadcast device can be attached (e.g., using a Velcro-equipped strap, such as extending through one or more loops 4405A, 4405B on the back side of the housing 4402) to the buoyancy compensator 27, similar to the manner illustrated in FIG. 1. The hose can be a high-pressure hose in that it can withstand the gas pressures within the gas tank 16, such as both at the water surface and at scuba diving depths. Within the housing 4402, a pressure transducer 4406 can transduce the pressure communicated by the hose into an electrical or other signal. The transduced signal can be processed by a controller circuit or other electronics located within the housing 4402, such as on the backside of a printed circuit board (PCB) assembly 4408. Such electronics can also include a speaker that can generate an audible "low-pressure" warning to the diver or to nearby divers. In a tank pressure broadcasting mode, selected high-intensity LEDs 4410 are illuminated, such as to provide a specified color indicative of a tank pressure condition. The LEDs can be viewed through a clear lens 4412 portion of the housing 4402. In an example, the lens 4412 can be prismatic or otherwise refractive, such as to increase the angle at which the emitted light can be viewed, such as when observed underwater. In such an example, the LEDs without the lens are observable across a viewing angle of about 120 degrees, but the refractive lens 4412 extends the viewing angle to at or near 180 degrees. In an example, portions of the housing 4402 other than the lens 4412 can be opaque, such as by painting such portions with a desired color, such as black, for example.

In an example, the housing 4402 can include two molded plastic pieces (e.g., ABS or ABS/polycarbonate blend) that can be bonded or sealed together to form a waterproof seal, such as an upper housing 4402A and a lower housing 4402B. In an example, the upper housing 4402A can include rails 4414A-B, into which the PCB assembly 4408 can be inserted and retained. The hose coupling 4404 can be attached and sealed to the upper housing 4402A. The lower housing 4402B can include battery receptacles 4416A-B, such as to receive size AA batteries 4418A-B, in an example. In another example, a high storage capacity lithium or other battery can be alternatively or additionally used. Aluminum or other battery plug contacts 4420A-B can threadably or otherwise engage the battery receptacles 4416A-B, such as to seal and prevent water from entering into the battery receptacles 4416A-B. In an example, the plug contacts 4420A-B can respectively include an external slot, such as to twist the plug contact 4420A-B during insertion or removal. The plug contacts 4420A-B make electrical contact with a first terminal of a battery. An opposite terminal of the battery can be contacted by a phosphor bronze or other bending contact, which can be affixed to the PCB assembly 4408.

In an example, a disk-shaped rotary dial or other switch control 4422 can be mounted to the outside of the housing 4402, such as using a screw 4423 through its center that engages a threaded sleeve 4425, or other retainer. In an example, a thumb lever 4424 extending from the rotary switch control 4422 can help a user turn the rotary switch control 4422, as desired. In an example, the rotary switch control 4422 can include a magnet 4428. By rotating the rotary switch control 4422, the magnet 4428 can be moved between multiple positions. In an example, repositioning of the magnet 4428 can be used to selectively open or close one or more reed switches located inside of the housing 4402. In another example, repositioning of the magnet 4428 can be detected by a Hall-effect or other magnetic sensor located inside of the housing 4402. In either case, this allows the rotary switch control 4422, which can be located outside of the housing 4402, to communicate with one or more switches or sensors that are located inside of the housing 4402. This allows wireless signaling, which avoids a need for a complicated conductive electrical feedthrough to maintain a watertight seal. In an example, the rotary switch control 4422 can be used to turn the device 4400 on or off. In a further example, the rotary switch control 4422 can also be used to put the device into a lower illumination (e.g., low-glare) mode, such as for night diving or energy conservation, as explained below. The rotary switch control 4422 can be used to engage or disengage other operating modes, and one or more separate such rotary or other switch controls 4422 can be included in the visual broadcast device 4400. For example, it may be desirable to provide a separate rotary switch control 4422 for engaging and disengaging a BEACON mode, such as described below.

Figure 45:
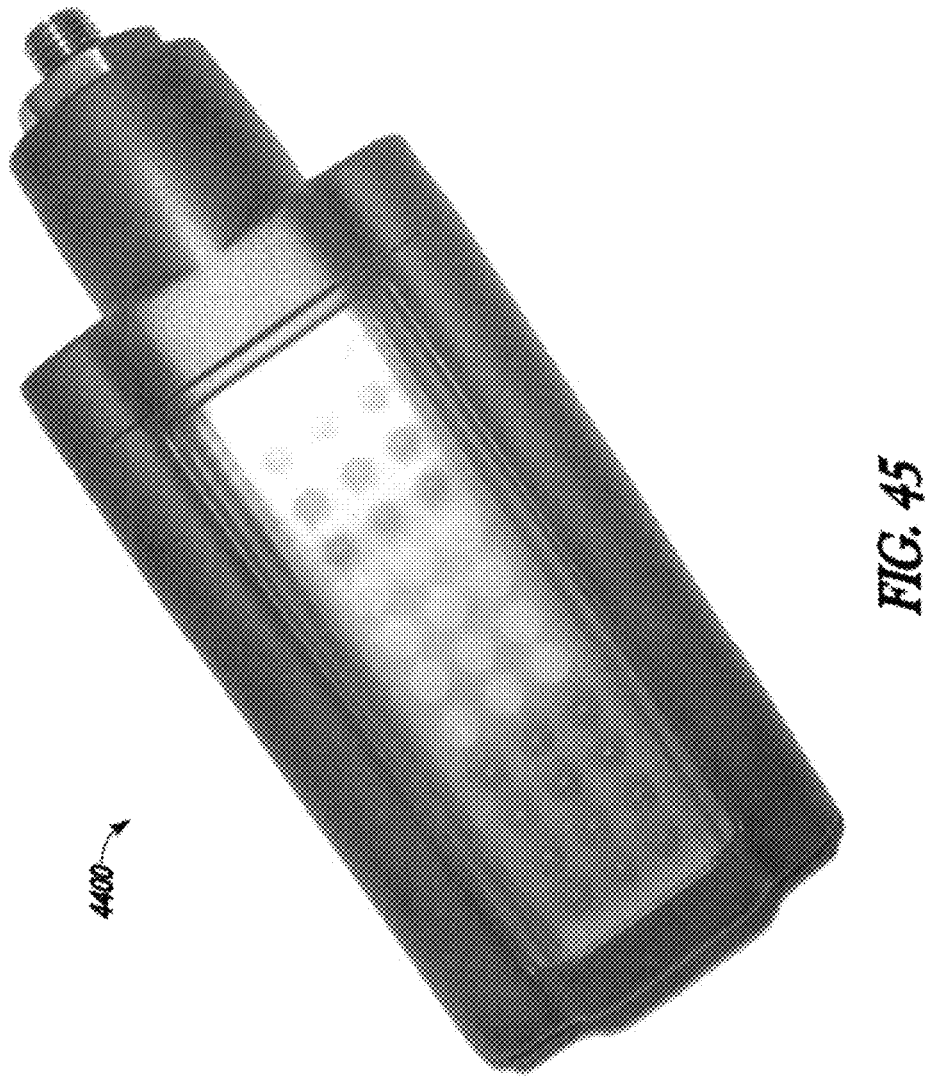
FIG. 45 is a color photograph of an example of the visual broadcast device 4400 shown in FIGS. 44A, 44B, and 44C formed in accordance of an embodiment of the invention.

FIG. 45 is a color photograph of an example of the visual broadcast device 4400 shown in FIGS. 44A, 44B, and 44C. In this example, the LEDs 4410 can include banks of three different colors, such as a first bank of twelve red LEDs 4410 (e.g., shown as the left-most twelve LEDs, away from the coupling), a second bank of twelve yellow LEDs 4410 (e.g., shown as the center twelve LEDs), and a third bank of twelve green LEDs 4410 (e.g., shown as the right-most twelve LEDs, toward the coupling). In certain examples, the bank of LEDs can include more than twelve LEDs (e.g., a bank of fifteen LEDs, a bank of twenty LEDs, and the like). In an example, the LEDs 4410 can include high intensity LEDs within an illumination intensity that exceeds 1000 millicandles per LED, such as 1400 millicandles per LED. This can provide a total illumination of at least 12,000 millicandles per bank, such as about 16,800 millicandles per bank. The electronic circuitry on the PCB assembly 4408 can include a switched-mode or other DC/DC boost converter to provide an operating voltage to the LEDs (e.g., up to 24 Volts, in an example) that is generated from the lower terminal voltages available from the batteries 4418A-B, which, in an example, can be placed in series or in parallel with each other. The banked arrangement of the different colors of high intensity LEDs helps permit viewing of the different colors by a remote typical human viewer at a distance of ten to twelve feet, or even at twenty-five feet, underwater under ordinary visibility conditions. Illumination from the high intensity LEDs can be observed by such an underwater remote observer even at fifty feet, although differentiation between the different colors at such a distance may be difficult or not possible, but still, the position of the illuminated LEDs can provide pressure information to a remote visual observer at such a distance even if the colors cannot be distinguished. Such a banked arrangement of such high intensity can allow remote visual monitoring of the pressure status of a first diver by a second diver located at such a distance away—without succumbing to color degradation that the present inventors have recognized would otherwise occur at such distance using low-intensity (e.g., 10-20 millicandles) and unbanked LEDs. Such color degradation would permit the viewer to observe light, but would leave the viewer unable to discern the color of the light, thereby rendering the color-coded visual broadcast information useless.

In an illustrative example, a full tank (e.g., 5000 psi to 2000 psi) can be represented by visual broadcast displaying of a consistent (e.g., substantially constant) illumination of the bank of green LEDs 4410, a semi-full tank (e.g., 2000 psi to 1000 psi) can be represented by visual broadcast displaying of a consistent illumination of the bank of yellow LEDs 4410, a low tank (e.g., 1000 psi to 500 psi) can be represented by visual broadcast displaying of a consistent illumination of the bank of red LEDs 4410, and a critically low tank (e.g., less than 500 psi) can be represented by a flashing illumination of the bank of red LEDs 4410, which also can be accompanied by an audible alarm. In an example, the LEDs can be turned on and off in a high frequency power-saving duty cycle that still maintains a visually consistent (e.g., substantially constant) appearance to a human observer.

In an example, the rotary switch control 4422 can include, OFF, ON, and LOW-ILLUMINATION positions. In an example, if the user has actuated a low-illumination mode (e.g., for night-diving or energy conservation to increase battery longevity), such as by turning the rotary switch control 4422 to an appropriate position, the green and yellow displays are inhibited (or, alternatively, a single such LED is illuminated, rather than the whole bank), and the red display operates as described in the previous paragraph. In a further low-illumination example, the audible alarm briefly sounds upon the transition from green to yellow, and from yellow to red.

In an example, the same (or preferably a different) rotary switch control 4422 can include a BEACON position, which actuates a visual beacon that includes coordinated on and off strobing or flashing of all of the LEDs 4410. This can help assist in locating the diver underwater, or at the surface of the water, such as from well-above the surface of the water (e.g., from an airplane, a boat, and the like).

In an example, the same or a different rotary switch control 4422 can include a LIGHT position, which actuates all of the LEDs 4410, such as to provide an illumination source for the diver's use.

FIGS. 46A, 46B, and 46C illustrate an example in which the visual broadcast device 4400 additionally includes an alphanumeric pressure readout display 4602, such as can be provided on a riser 4600 portion of the housing 4402. In an example, the display 4602 can provide a digital readout of the transduced gas pressure of the gas tank 16, such as computed by the controller circuit located on the PCB assembly 4408. In an example, the display 4602 can include a digital alphanumeric or other liquid crystal display (LCD), which can be back-lit by one or more of the LEDs 4410. In an example, the display 4602 can include an organic liquid crystal display (OLCD), which need not use any separate backlighting. In an example, the display 4602 can display additional information other than the transduced pressure of the gas tank 16, such as depth (e.g., using a separate depth pressure sensor provided by the visual broadcast device 4400), the amount of time a diver spends underwater (e.g., bottom time information), or full dive-computer information and the like.

A technical effect of the various embodiments is to use a visual broadcast device 10 connected to a breathing gas supply system to detect based on a gas pressure and provide a visual and auditory indication of the amount of gas remaining in a gas tank based on the measured pressure.

In various embodiments of the invention provide a method of detecting a pressure of a gas supply and providing a visual, as well as auditory indication of the amount of gas remaining in a gas tank as described herein or any of its components may be embodied in the form of a processing machine. Typical examples of a processing machine include a general-purpose computer, a programmed microprocessor, a digital signal processor (DSP), a micro-controller, a peripheral integrated circuit element, and other devices or arrangements of devices, which are capable of implementing the steps that constitute the methods described herein.

As used herein, the term "microcontroller" may include any processor-based or microprocessor-based system including systems using computers, reduced instruction set circuits (RISC), application specific integrated circuits (ASICs), logic circuits, processor, and any other circuit or processor capable of executing the functions described herein. The above examples are exemplary only, and are thus not intended to limit in any way the definition and/or meaning of the term "microcontroller".

The processing machine executes a set of instructions (e.g., corresponding to the method steps described herein) that are stored in one or more storage elements (also referred to as computer usable medium). The storage element may be in the form of a database or a physical memory element present in the processing machine. The storage elements may also hold data or other information as desired or needed. The physical memory can be, for example, but not limited to, an electronic, magnetic, optical, electromagnetic, infrared, or semiconductor system, apparatus, device, or propagation medium. More specific examples of the physical memory include, but are not limited to, the following: a random access memory (RAM) a read-only memory (ROM), an erasable programmable read-only memory (EPROM or Flash memory), a Hard Disc Drive (HDD) and a compact disc read-only memory (CDROM). The above memory types are exemplary only, and are thus limiting as to the types of memory usable for storage of a computer program.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

In various embodiments of the invention provide a method of detecting a pressure of a gas supply and providing a visual, as well as auditory indication of the amount of gas remaining can be implemented in software, hardware, or a combination thereof. The methods provided by various embodiments of the present invention, for example, can be implemented in software by using standard programming languages such as, for example, C, C++, Java, and the like. As used herein, the terms "software" and "firmware" are interchangeable, and include any computer program stored in memory for execution by a computer.

It is to be understood that the above description is intended to be illustrative, and not restrictive. For example, the above-described embodiments (an/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A gas measurement apparatus, comprising:
    a housing, comprising:
        a sensor, configured to measure a pressure of a gas tank;
        a gas input coupling, configured to receive gas from the gas tank for communication to the sensor;
        a light source, comprising a plurality of distinct positions or colors to indicate a corresponding level of gas remaining in the gas tank when illuminated, wherein each position or color of the light source includes a plurality of high-intensity light emitting diodes (LEDs), wherein the light source is configured to be visible to a person remote from the gas measurement apparatus, wherein the housing includes a refractive lens integral with the housing and configured to provide a viewing angle of the light source of substantially 180 degrees; and
        a processor, configured to select the plurality of high-intensity light emitting diodes (LEDs) of at least one of the distinct positions or colors of the light source to indicate the level of gas remaining in the gas tank based on the measured pressure.

2. The apparatus of claim 1, comprising a hose, configured to extend between the coupling and a regulator port associated with the gas tank, to communicate the gas from the gas tank to the pressure sensor at the housing.

3. The gas measurement apparatus of claim 1, wherein the gas measurement apparatus is associated with a personal breathing apparatus.

4. The gas measurement apparatus of claim 1, wherein the housing comprises the light source, wherein the light source comprises a plurality of differently colored banks of light emitting diodes (LEDs).

5. The gas measurement apparatus of claim 4, wherein the light source is configured such that different colors of the differently colored banks of LEDs are visually distinguishable by color underwater by a human observer from at least 10 feet away.

6. The gas measurement apparatus of claim 5, wherein the light source is configured such that different colors of the differently colored banks of LEDs are visually distinguishable by color underwater by a human observer from at least 25 feet away.

7. The gas measurement apparatus of claim 1, wherein the light source is configured such that the light source is visible underwater by a human observer from at least 50 feet away.

8. The gas measurement apparatus of claim 1, wherein the housing comprises an alphanumeric display that is configured to provide alphanumeric information about a measured pressure of the gas tank.

9. The gas measurement apparatus of claim 1, wherein the housing comprises a light source that includes a user-activated beacon mode in which light emitting diodes (LEDs) from differently colored banks are illuminated concurrently.

10. The gas measurement apparatus of claim 1, wherein the housing comprises a light source that includes a user-activated beacon mode in which at least two light emitting diodes (LEDs) are illuminated concurrently to provide a total illumination of at least 2000 millicandles.

11. The gas measurement apparatus of claim 1, comprising a user-activatable control that includes a magnet configured to actuate a magnetic field sensing device in the housing.

12. The gas measurement apparatus of claim 1, comprising a light source comprising a first bank of multiple green light emitting diodes (LEDs), a second bank of multiple yellow LEDs, and a third bank of multiple red LEDs, configured to provide information about the measured pressure of the gas tank.

13. The gas measurement apparatus of claim 12, comprising a full tank indication represented by consistent illumination of the first bank, a semi-full tank indication represented by consistent illumination of the second bank, a low tank indication represented by consistent illumination of the third bank, and a critically low tank indication represented by a flashing illumination of the third bank.

14. The gas measurement apparatus of claim 13, in which the critically low tank indication is additionally represented by an audible alarm.

15. The gas measurement apparatus of claim 13, in which a transition between tank conditions is accompanied by an audible alert.

16. The gas measurement apparatus of claim 1, in which the housing comprises a display including an alphanumeric readout, the display configured to provide at least two of tank pressure, depth, or bottom time information.

17. A method comprising:
    providing gas from a gas tank to a pressure sensor located in a housing that is remote from the gas tank;
    measuring the gas tank pressure using the pressure sensor; and
    illuminating a light source at the housing, wherein the light source includes a plurality of distinct positions or colors, wherein each of the plurality of distinct positions or colors is configured to indicate a corresponding level of gas remaining in the gas tank when illuminated, wherein each position or color of the light source includes a plurality of high-intensity light emitting diodes (LEDs), the housing including a refractive lens integral with the housing and configured to provide a viewing angle of the light source of substantially 180 degrees, the level of gas based on the measured pressure, wherein the light source is configured to be visible to a person remote from the gas measurement apparatus.

18. The method of claim 17, wherein illuminating the light source comprises illuminating a selected one of a plurality of differently colored banks of light sources, so as to produce different colors that are visually distinguishable by a human observer underwater at a distance of at least 10 feet away.

19. The method of claim 18, wherein illuminating the light source comprises illuminating a selected one of a plurality of differently colored banks of light sources, so as to produce different colors that are visually distinguishable by a human observer underwater at a distance of at least 25 feet away.

20. The method of claim 17, wherein illuminating the light source comprises providing an illumination that is visible underwater by a human observer at a distance of at least 50 feet away.

21. The method of claim 17, wherein illuminating the light source comprises illuminating a plurality of differently colored banks concurrently in response to a user command.

22. The method of claim 21, wherein the illuminating the plurality of differently colored banks concurrently comprises flashing the plurality of differently colored banks to provide a visually interrupted illumination.

23. The method of claim 17, further comprising providing an alphanumeric pressure readout of the measured pressure in addition to illuminating the light source to provide an indication of the measured pressure.

24. The method of claim 17, comprising providing at the housing a display that comprises an alphanumeric output, and using the display to provide at least two of gas tank pressure, depth, or bottom time information.

* * * * *